United States Patent
Yamazaki et al.

(10) Patent No.: US 7,436,559 B2
(45) Date of Patent: Oct. 14, 2008

(54) LOAD ASSIGNMENT IN IMAGE PROCESSING BY PARALLEL PROCESSING

(75) Inventors: Satoshi Yamazaki, Nagano-ken (JP);
Kohei Utsunomiya, Nagano-ken (JP);
Teruyuki Takata, Nagano-ken (JP);
Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 607 days.

(21) Appl. No.: 11/069,855

(22) Filed: Feb. 28, 2005

(65) Prior Publication Data

US 2005/0206920 A1    Sep. 22, 2005

(30) Foreign Application Priority Data

Mar. 1, 2004    (JP)    ............... 2004-056334
Mar. 10, 2004    (JP)    ............... 2004-066983

(51) Int. Cl.
*H04N 1/405*    (2006.01)
*G06F 9/50*    (2006.01)
*G06F 15/80*    (2006.01)
*G06K 9/36*    (2006.01)
*G06K 9/54*    (2006.01)
*G06K 15/02*    (2006.01)

(52) U.S. Cl. ............... 358/534; 358/3.03; 358/3.06; 358/536; 718/102; 718/103; 718/105; 712/28; 712/203; 382/276; 382/302; 382/304

(58) Field of Classification Search ............... 358/1.9, 358/3.03, 3.05, 3.06, 534; 382/304; 718/105
See application file for complete search history.

(56) References Cited

U.S. PATENT DOCUMENTS 5,765,146 A * 6/1998 Wolf et al. ............... 707/2

(Continued)

FOREIGN PATENT DOCUMENTS

JP    2000-293674    10/2000

OTHER PUBLICATIONS

Performance Modeling of Operating Systems Using Object-Oriented Simulation—A Practical Introduction. Garrido, Jose M. Print (c)2000 Kluwer Academic/Plenum Publishers. First Edition. pp. 85-109.*

(Continued)

*Primary Examiner*—Twyler L. Haskins
*Assistant Examiner*—Fred Guillermety
(74) *Attorney, Agent, or Firm*—Martine Penilla & Gencarella, LLP

(57) ABSTRACT

In image processing carried out by means of repeated execution of process set which includes N unit processes (where N is an integer equal to 3 or greater), prior to execution of the process groups, the N unit processes are assigned to a number M (where M is an integer equal to 2 or greater, but less than N) of processing modules for executing the unit processes. First, on the basis of execution results of unit processes included in the process group executed immediately prior, there is estimated an estimated load of unit processes of each class in the next process group. Then, on the basis of the estimated load, the N unit processes are assigned to the processing modules. During this process, a selected unit process which is one of the unit processes not yet assigned to a processing module, is assigned to one of the processing modules.

28 Claims, 22 Drawing Sheets

U.S. PATENT DOCUMENTS

| | | | | |
|---|---|---|---|---|
| 5,881,283 | A | * | 3/1999 | Hondou et al. ............... 718/100 |
| 5,930,010 | A | * | 7/1999 | Cheung et al. ............... 358/534 |
| 6,532,016 | B1 | * | 3/2003 | Venkateswar et al. ....... 345/504 |
| 2003/0137698 | A1 | * | 7/2003 | Pritchard ................... 358/3.06 |
| 2004/0008382 | A1 | * | 1/2004 | Barbalet .................... 358/3.03 |
| 2004/0207879 | A1 | * | 10/2004 | Bailey et al. ............... 358/3.03 |
| 2005/0141017 | A1 | * | 6/2005 | Matsumura ................. 358/1.15 |
| 2005/0260021 | A1 | * | 11/2005 | Abello ........................ 400/62 |

OTHER PUBLICATIONS

Abstract of Japanese Patent Publication No. 2000-293674 Pub. Date: Oct. 20, 2000, Patent Abtracts of Japan.

\* cited by examiner

LOAD ASSIGNMENT IN IMAGE PROCESSING BY PARALLEL PROCESSING

BACKGROUND OF THE INVENTION

1. Field of the Invention

The present invention relates to image processing by means of parallel processing technology.

2. Description of the Related Art

To date, there has been developed technology for carrying out parallel processing, when converting image data represented in terms of tone values of ink colors of pixels into image data represented in terms of the dot on-off state of the ink color of each pixel. For example, JP2000-293674A discloses technology for executing, according to process content, a rasterizing (sorting) process and a halftone process, as separate threads.

However, the technology cited above gives no consideration to variability in processing load among threads, i.e. among processing modules.

With the foregoing in view, it is a object of present invention to provide technology whereby variability in processing load among processing modules can be minimized when out image processing by means of parallel processing, so that processes are executed efficiently.

The present invention is related to Japanese patent applications No. 2004-056334, filed Mar. 1, 2004 and No. 2004-066983, filed Mar. 10, 2004; the contents of which are incorporated herein by reference.

SUMMARY OF THE INVENTION

To achieve the above object, the following processes are performed in image processing carried out by repeated execution of a process set which includes N unit processes. N is an integer equal to 3 or greater. This image processing may be executed, for example, in an image processing device having an image processing portion that includes M processing modules for executing the process set to perform image processing; and an assigning portion which is configured to assign the N unit processes of a next process set to be executed to the M processing modules. M is an integer equal to 2 or greater, but less than N.

During image processing, first, loads of respective unit process in the next process set are estimated based on execution results of unit processes included in a process set executed immediately prior to execution of the next process set. Then the N unit processes are assigned to the processing modules based on the estimated loads. In the assignment of the N unit processes, a unit process is selected from unassigned unit processes which are not yet assigned to the processing module. Then the selected unit process is assigned to one of the processing modules.

In such an embodiment, since the loads of unit processes are determined based on the previous processing results, it is possible to accurately estimate loads, with minimal deviation from actual load. Also, in such an embodiment, unit processes can be assigned in order, in consideration of loads assigned to processing modules up to that point.

It is preferable that the selected unit process is selected from among the unassigned unit processes, and other than a unit process with the smallest estimated load.

In such an embodiment, the unit process with the smallest estimated load can be assigned last to a processing module. Thus, by assigning the last unit process to a processing module, the possibility of increasing variability in load among processing modules is low.

In preferred practice, the selected unit process may be the unit process with the largest estimated load, among unassigned unit processes.

In such an embodiment, unit processes with smaller load are to be assigned at later points in time to processing modules. Thus, it is possible at later points in time to assign unit processes while finely adjusting the load on each processing module. Thus, variability in load among processing modules can be minimized, so that image processing can be executed efficiently.

Also, in preferred practice, after all unit processes contained in a single process set are completed, the unit processes contained in the process set are executed in the processing modules. In such an embodiment, assignment of unit processes to processing modules is determined in advance prior to execution. Thus, process groups can be executed rapidly.

A unit process may be a process for converting first partial image data in which shading of predetermined color of an area of predetermined size in an image is represented by tone values of pixels, into second partial image data in which shading of predetermined color of an area of predetermined size in an image is represented in terms of the on-off state of dots of predetermined color in pixels. In other words, each unit process may be a halftone process for a predetermined ink color relating to an area of predetermined size in an image. The process set is preferably a set of unit processes of mutually different ink colors, targeted to a same area of the image. A plurality of the process sets for adjacent areas in the image are executed in order of arrangement of the adjacent areas in the image.

In a single image, it is common for adjacent areas to have color present in similar proportions. Thus, in an embodiment such as that described above, based on execution results of a process group of an adjacent area in which color is present in similar proportions, it is possible to accurately estimate the load of the process to be performed next.

the M processing modules may have mutually different basic ranks. In assigning the N unit processes to the processing modules, prior to assigning the selected unit process, one processing module to which the selected unit process is to be assigned may be selected, in accordance with an alternate assignment order. The alternate assignment order may include alternate use of a first order going from a processing module with the highest basic rank to a processing module with the lowest basic rank, and a second order going from the processing module with the lowest basic rank to the processing module with the highest.

Where unit processes are assigned in the first order of largest load to processing modules, if unit processes are assigned repeatedly to processing modules according to the first order, problems such as the following may occur. Specifically, it is possible for the load on processing modules that come earlier in the order to exceed the load on processing modules that come later in the order. In an embodiment described above, however, processing modules for assignment of unit processes are selected repeatedly while alternating between ascending order and descending order of basic rank. Accordingly, the variability in load among processing modules may be avoided.

The one processing module to which the selected unit process is assigned may be a processing module with the smallest total estimated load of previously assigned unit processes. According to such an embodiment, unit processes can be assigned so as to lower variability in load.

The present invention may be reduced in an embodiment as follows. Specifically, it is an image processing device for repeatedly executing a process set which includes N unit processes to perform image processing. N is an integer equal to 3 or greater. The device may comprise: an image processing portion including M processing modules, for executing the process set to perform image processing; and an assigning portion which is configured to assign one of the N unit processes of a next process set to be executed to one of the M processing modules during another of the unit processes of the process set is being executed by another of the M processing modules. M is an integer equal to 2 or greater, but less than N.

In such an embodiment, loads of respective unit process in the next process set are estimated based on execution results of unit processes included in a process set executed immediately prior to the execution of the next process set. Then a unit process which is one of unassigned unit processes. The unassigned unit processes are unit processes which are not assigned to the processing modules. The selected unit process are assigned to a processing module that has completed unit processes previously assigned to.

In such an embodiment, unit processes can be assigned so as to reduce variability in load among the processing modules. Thus, variability in load among processing modules can be minimized, so that image processing can be executed efficiently.

In preferred practice, after completing assignment of a selected unit process, execution of the unit process which was the selected unit process may commence in the processing module, prior to assigning the next unit process. In such an embodiment, unit processes can be assigned to processing modules while unit processes are being executed in another processing modules.

The image processing module may be configured to execute the process set by means of hyper-threading. In such an embodiment, the processing modules are threads.

To achieve the above object, the following embodiment may be employed in image processing which is carried out by repeated execution of a process set including N unit processes (where N is an integer equal to 3 or greater). This image processing may be executed, for example, in an image processing device having an image processing portion that has M processing modules (where M is an integer equal to 2 or greater, but less than N) for executing the process set to perform image processing; and an assigning portion that assigns the N unit processes to the M processing modules prior to execution of the process sets.

In the image processing, based on the estimated loads, the N unit processes are grouped into a first process group and a second process group. The estimated load of each unit process in the second process group is smaller than that of unit processes included in the first process group. First, unit processes included in the first process group are assigned to the processing modules. After completing assignment of all unit processes included in the first process group to the processing modules, unit processes included in the second process group are assigned to the processing modules. In the assignment of unit processes in the second process group, a minimum load processing module is select from processing modules. The minimum load processing module is a processing module which has the smallest total of estimated load of unit processes previously assigned. Then one unit process included in the second process group that has not yet been assigned to the processing module is assigned to the minimum load processing module.

In such an embodiment, after the first process group has been assigned, unit processes with smaller loads are assigned to those processing modules having the smallest total estimated load of unit processes previously assigned thereto. Thus, variability in load among processing modules can be minimized, so that image processing can be executed efficiently.

In preferred practice, after all of assignments of the unit processes included in a single process set have been completed, the unit processes included in the process set are executed in the processing modules. In such an embodiment, unit process assignments to processing modules are determined in advance prior to execution. Thus, process sets can be executed quickly.

A unit process may be a process for converting first partial image data into second partial image data. In the first partial image data, shading of predetermined color of an area of predetermined size in an image is represented by tone values of pixels. In the second partial image data, shading of predetermined color of an area of predetermined size in an image is represented in terms of the on-off state of dots of predetermined color in pixels. That is, each unit process may be a halftone process for a predetermined ink color relating to an area of predetermined size in an image. The process set may be a set of unit processes of mutually different ink colors, targeted to a same area of the image. A plurality of the process sets for adjacent areas in the image may be executed in order of arrangement of the adjacent areas in the image.

In a single image, it is common for adjacent areas to have color present in similar proportions. Thus, in an embodiment described above, it is possible to accurately estimate the load of the process to be performed next, based on execution results of a process set of an adjacent area in which color is present in similar proportions.

It is preferable that the one unit process included in the second process group assigned to the minimum load processing module is an unit process that has the largest estimated load among unit processes included in the second process group unit processes and not yet assigned to the processing modules.

In such an embodiment, unit processes with smaller load are to be assigned at later points in time to processing modules. Thus, variability in load among processing modules can be minimized.

Where the unit processes include: a first type of unit process and a second type of unit process, an embodiment such as the following is preferred. In the first type of unit process, the halftone process is performed using a first halftone method. In the second type of unit process, the halftone process is performed using a second halftone method different from the first halftone method. In the preferred embodiment, unit processes which are assigned to the processing modules in the assignment of the unit processes of the first process group are executed, in an assigned processing module, in order in which the unit processes were assigned. In such the embodiment, it is preferable that the unit processes are assigned to the processing modules in such a way that while the first type of unit process is being executed by a processing module, the second type of unit process is executed by another processing module.

With such an embodiment, parallel execution of different types of processes by different processing modules is likely to be realized. Thus, it becomes possible to reduce the possibility of load becoming concentrated in a particular element within the device that executes the processes, so that the processing capacity of the element becomes a bottleneck, lowering processing efficiency.

In preferred practice, when assigning unit processes of the first process group to processing modules, a unit process as follows is assigned to the minimum load processing module. The assigned unit process may be a unit process which has the largest estimated load among unit processes that have not yet been assigned to processing units and whose halftone method differs from that of an unit process assigned just prior.

With such an embodiment, different types of unit processes are assigned in order to processing modules. In some embodiment, unit processes assigned to processing modules may be executed in the order in which they have been assigned in the processing modules. Thus, according to such an embodiment, unit processes of the first process group can be assigned to processing modules such that while a unit process (halftone method) of the first type is being executed by a predetermined processing module, a unit process (halftone method) of the second type is processed by another processing module.

The first halftone method may be an error diffusion method; the second halftone method may be a dither method. With such an embodiment, the possibility of numerous error diffusion methods, which have high load, being processed in parallel at the same time can be reduced, as a result of which image processing can be carried out efficiently.

The present invention may also be realized as an image processing device such as the following. Specifically, it can be an image processing device comprising an image processing portion (unit) having processing modules for executing unit processes; and an assigning portion that, during one of the unit processes of a process set is being executed, assigns another unit process of the process set to the processing modules. The number of the processing modules in the image processing portion is 2 or more but less than that number of classes of unit processes.

In such an embodiment, based on execution results of unit processes included in a process set executed immediately prior, an estimated load of unit process in a next process group may be estimated. A selected unit process which is one of unit processes not assigned to the processing modules is selected. The selected unit process is then assigned to a processing module that has completed unit processes previously assigned to.

In such an embodiment as well, after the first process group has been assigned, a unit process with smaller load is assigned to the processing module having the smallest total estimated load of unit processes assigned to it previously. Thus, variability in load among processing modules can be minimized, so that image processing can be executed efficiently.

In preferred practice, after completing assignment of one unit process, prior to assigning the next unit process, execution of the one unit process in the processing module may be initiated. In such an embodiment, the unit process can be assigned to the processing module while another unit process is being executed in another processing module.

When assigning one unit process of the second process group not yet assigned to a processing module that has completed execution of the unit process assigned to it previously, the following is preferable. Specifically, the selected unit process has the largest estimated load, among the unit processes not yet assigned to the processing modules.

With such an embodiment, unit processes with smaller loads can be assigned later on. Thus, variability in load among processing modules can be equalized more finely.

The invention can be realized through a variety of embodiments. For example, it could be realized as a process assignment method, a process assignment device, an image processing method, an image processing device, a printing control method, a printing control device, a printing method, a printing method device, a computer program for realizing the functions of such methods or devices, a recording medium having recorded thereon a computer program for this purpose, or other embodiment.

These and other objects, features, aspects, and advantages of the present invention will become more apparent from the following detailed description of the preferred embodiments with the accompanying drawings.

DETAILED DESCRIPTION OF THE INVENTION

The following description of the embodiments of the invention will be made in the order indicated below.
- A. Embodiment 1
  - A1. Overall Device Arrangement
  - A2. CPU Internal Arrangement
  - A3. Color Conversion Process & Halftone Process
- B. Embodiment 2
- C. Embodiment 3
- D. Embodiment 4
- E. Variations

A. Embodiment 1

A1. Overall Device Arrangement

Figure 1:
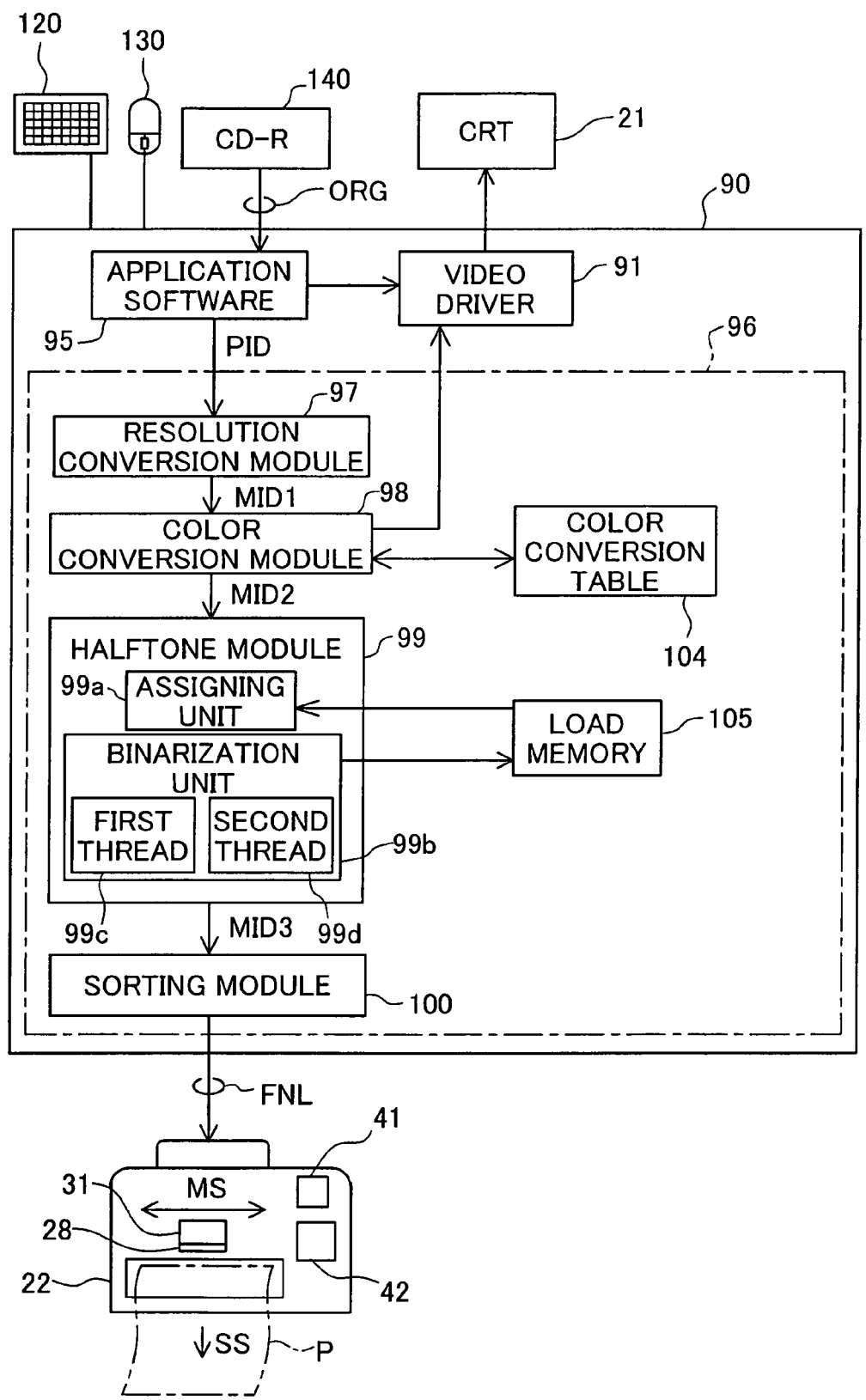
FIG. 1 is a block diagram showing the software arrangement of the printing system of Embodiment 1.

FIG. 1 is a block diagram showing the software arrangement of the printing system of Embodiment 1. On the computer 90, an application 95 runs on a predetermined operating system. The operating system includes a video driver 91 and a printer driver 96.

In response to a user instruction input from a mouse 130 or a keyboard 120, the application program 95 reads from a CD-R 140 original image data ORG comprising the three color components red (R), green (G), and blue (B). Then, in response to a instruction from the user, a process such as retouching is carried out on the original image data ORG. The application program 95 displays the processed image on a CRT display 21, through the agency of the video driver 91. When the application program 95 receives a print command from the user, the application program 95 issues a print instruction to the printer driver 96 and outputs the processed image to the printer driver 96 as preliminary image data PID.

The printer driver 96 receives the preliminary image data PID from the application program 95, and converts this to print image data FNL processable by the printer 22 (here, a multivalue signal for seven colors, namely, cyan, magenta, yellow, black, light cyan, light magenta, and dark yellow).

In the example shown in FIG. 1, the printer driver 96 comprises a resolution conversion module 97, a color conversion module 98, a color conversion table 104, a halftone module 99, a load memory 105, and a sorting module 100.

The resolution conversion module 97 converts the resolution of the preliminary image data PID to the resolution at which printing is carried out by the printer 22. During printing of a color image, the color conversion module 98, while referring to the color conversion table 104 (which is a three-dimensional lookup table), converts image data MID1 in which colors of pixels are represented by RGB tone values, into image data MID2 in which colors of pixels are represented by tone values of the cyan (C), magenta (M), yellow (Y), black (K), light cyan (LC), light magenta (LM), and dark yellow (DY) used by the printer 22.

Light cyan is ink of color having the same hue as cyan, but lighter than cyan. Light magenta is ink of color having the same hue as cyan, but lighter than magenta. Dark yellow is ink of color having the same hue as yellow, but darker than yellow.

The halftone module 99 performs a halftone process on image data MID2 in which color density of pixels is represented by tone value of the colors, to convert it into image data MID3 in which color density is represented in a format based on the dot on-off state (also referred to as "print data" or "dot data"). The halftone process is also called a "binarization process." This halftone process is carried out by an error diffusion method for light cyan (LC), light magenta (LM), and cyan (C), and by a dither method for magenta (M), yellow (Y), black (K), and dark yellow (DY).

The "dither method" is a process by which an n×m (n and m are positive integers) dither matrix having respective thresholds in elements that correspond to pixels is compared to a partial image area composed of n×m pixels, and determining dot on-off state depending on whether the tone value of each pixel in the partial image area is higher than the corresponding threshold. The "error diffusion method" is a method by which the dot on-off state for a single target pixel is determined through comparison with a threshold, and deviation (error) between the two-tone density representation produced by a dot on-off state and a multilevel tone value is diffused into other pixels which are not the target pixel yet, so as to be added onto those pixels.

Typically, when a given set of data is subjected to a halftone process, using the dither method involves less of a processing load than does using the error diffusion method. However, where a halftone process is carried out by the error diffusion method, the image printed result is generally of high quality. Thus, for light cyan, light magenta, and cyan, for which the quality of printed results is quite noticeable the halftone process is carried out using the error diffusion method, whereas for yellow, for which the quality of printed results is not very noticeable, the halftone process is carried out using the dither method. For the other ink colors, either method could be selected for use, in consideration of the overall load imposed on the system.

The image data MID3 generated by the halftone module 99 is sorted by the sorting module 100 in the order in which it will be sent to the printer 22, and output as final print image data FNL.

The printer 22 comprises a mechanism for feeding paper P by means of a feed motor; a mechanism for reciprocating a carriage 31 in the direction MS perpendicular to the paper P feed direction SS, by means of a carriage motor; a print head 28 carried on the carriage 31, for ejecting ink to form dots; P-ROM 42 for storing settings data of various kinds; and a CPU 41 for controlling the feed motor, the carriage motor, the print head 28, the P-ROM 42, and a control panel 32. The printer 22 receives the print image data FNL, and in accordance with the print image data FNL executes printing by forming dots on the printing medium using cyan (C), magenta (M), yellow (Y), black (K), light cyan (LC), light magenta (LM), and dark yellow (DY).

Herein, "printing device" refers only to the printer 22 in the narrow sense, but in a wide sense could also represent an entire printing system that includes the computer 90 and the printer 22.

A2. CPU Internal Arrangement

The CPU 90a of the computer 90 is a CPU compatible with hyper-threading technology. This CPU 90a is able to perform parallel processing of two threads. In FIG. 1, these two threads are denoted as a first thread 99c and a second thread 99d. The arrangement and operation of this hyper-threading technology-compatible CPU 90a is described below.

Figure 2:
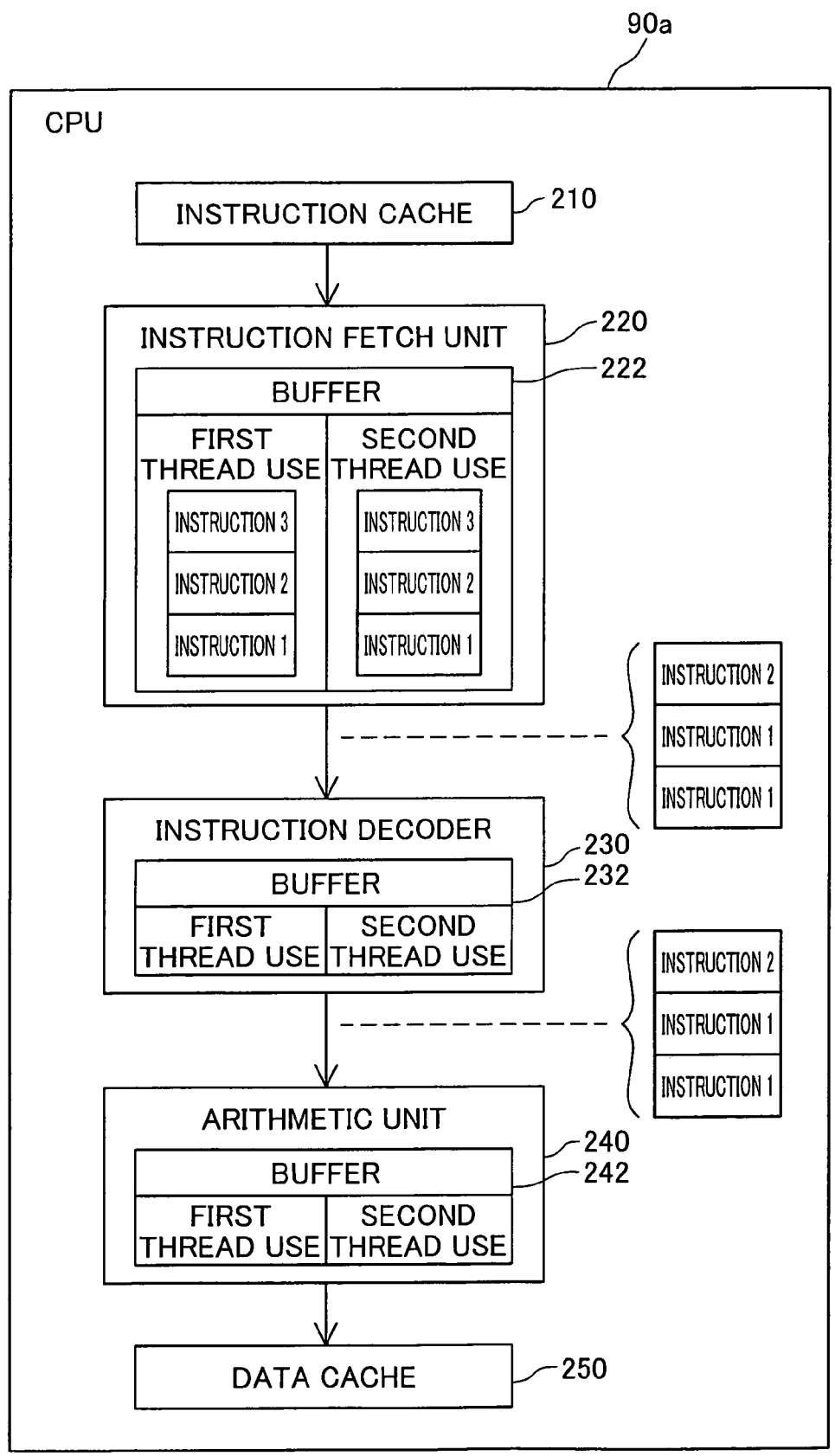
FIG. 2 is a block diagram showing the process in the CPU 90a of the computer 90.

FIG. 2 is a block diagram showing the process in the CPU 90a of the computer 90. The CPU 90a includes an instruction fetch unit 220, an instruction decoder 230, an arithmetic unit 240, and instruction cache 210, and a data cache 250. The instruction fetch unit 220, the instruction decoder 230, and the arithmetic unit 240 each have a buffer 222, 232, 242 for temporary storage of instructions and data processed by each. The buffers 222, 232, and 242 are each divided for use by the first thread and use by the second thread, respectively.

The instruction cache 210 stores instructions that have already been used once, and instructions that are anticipated to be used subsequently. The instruction fetch unit 220 specifies an address in the instruction cache 210 and retrieves (fetches) an instruction. Instructions for use in the first thread are stored in the buffer for first thread use. Instructions for use in the second thread are stored in the buffer for second thread use. In the event that a necessary instruction is not present in the instruction cache 210, the CPU 90a accesses the main memory (not shown) and retrieves the instruction from it.

Subsequently, the instruction fetch unit 220 hands over the retrieved instruction to the instruction decoder 230. A single instruction of the first thread is presented to the instruction decoder 230 at odd block timing, and a single instruction of the second thread is presented to the instruction decoder 230 at even block timing. That is, first thread instructions and second thread instructions are presented in alternating fashion to the instruction decoder 230. In FIG. 2, second thread instructions are indicated by hatching.

The instruction decoder 230 converts (decodes) an input instruction into micro code, and stores it in the buffer 232. If the decoded instruction is a first thread instruction, it is stored in the buffer for first thread use. If the decoded instruction is a second thread instruction, it is stored in the buffer for second thread use.

Subsequently, the instruction decoder 230 presents the decoded instruction to the arithmetic unit 240. A single instruction of the first thread is presented to the arithmetic unit 240 at odd block timing, and a single instruction of the second thread is presented to the arithmetic unit 240 at even block timing. The arithmetic unit 240 performs the specified arithmetic operations, and stores the operation results in the buffer, on a thread-by-thread basis.

With a conventional CPU, the buffers in the instruction fetch unit 220, the instruction decoder 230, and the arithmetic unit 240 are for use in their entirety for a single thread. In such an arrangement, when switching between threads being processed during multithreading, the instruction decoder 230 and the arithmetic unit 240 must each discard the instruction of the preceding thread stored in their buffers up to that point, and receive in order from the instruction fetch unit 220 a new instruction of the next thread. Thus, the instruction decoder 230 and the arithmetic unit 240 are idle until presented with the new instruction by the instruction fetch unit 220.

In an arrangement such as that described above, however, the two threads are processed in alternating fashion, on an instruction unit basis. Also, instructions of the two threads are stored simultaneously in the buffers 222, 232, 243 of the instruction fetch unit 220, the instruction decoder 230, and the arithmetic unit 240. Thus, once processing of one instruction of one of the threads has finished, the arithmetic unit 240 can immediately use the instruction of the other thread in the buffer to commence the next process. In other words, the pipeline can be utilized effectively. Also, in the event that an error or wait state occurs in one thread, processing on the other thread can proceed.

A3. Color Conversion Process & Halftone Process

Figure 3:
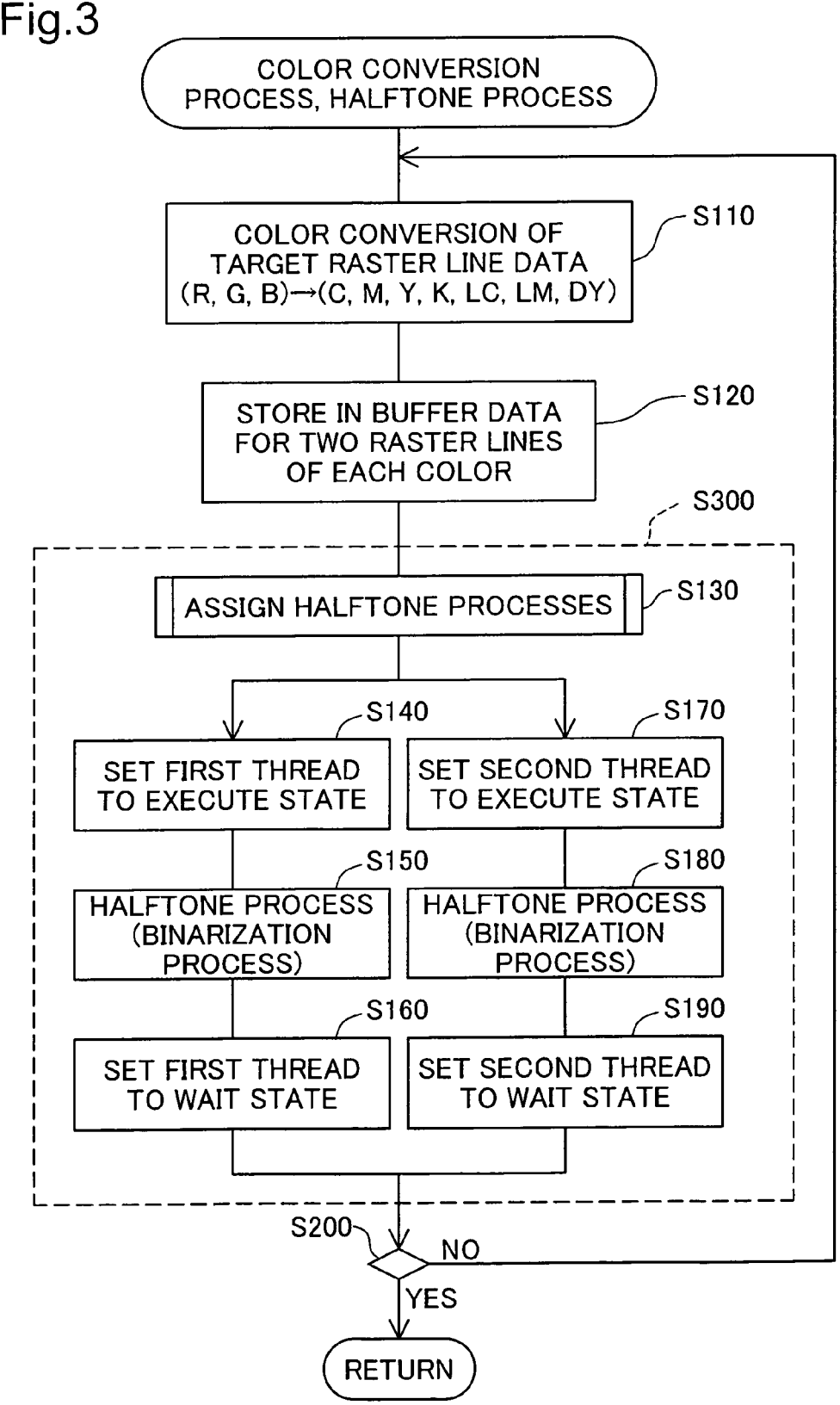
FIG. 3 is a flowchart showing the specific flows of the color conversion process and the halftone process.
Figure 4:
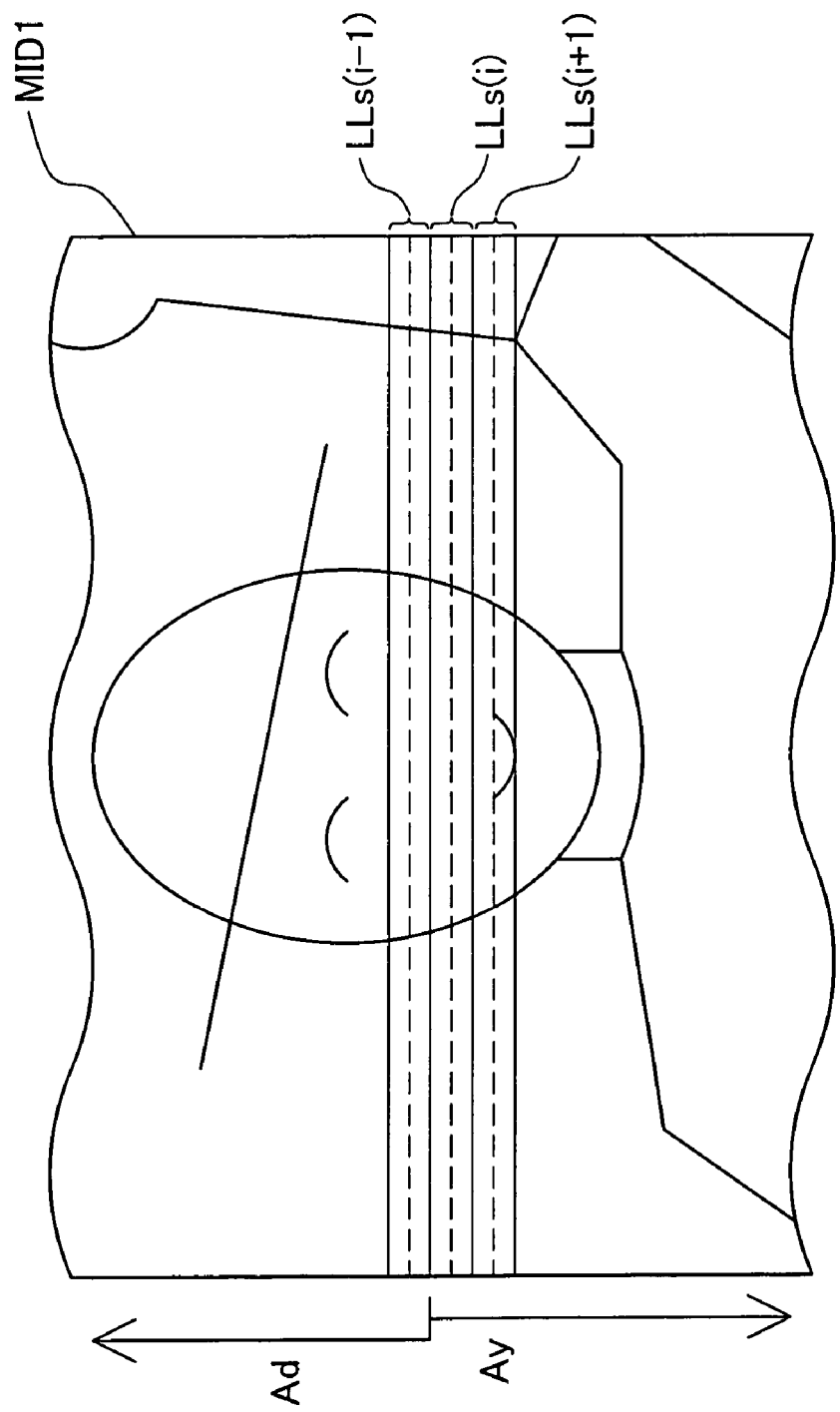
FIG. 4 illustrates a raster line LLs(i) for which the color conversion process and the halftone process are carried out.

FIG. 3 is a flowchart showing the specific flows of the color conversion process and the halftone process. FIG. 4 is an illustration showing raster lines LLs(i) for which the color conversion process and the halftone process are carried out. Specifically, the color conversion process by the color conversion module 98 shown in FIG. 1 and the halftone process by the halftone module 99 are carried out in increments of two raster lines in the image data MID1. That is, image data MID2 is transferred between the color conversion module 98 and the halftone module 99, in the form of partial images in increments of two raster lines each. A "raster line" is a row of pixels lined up in the main scanning direction.

In FIG. 4, the two raster lines being subjected to the color conversion process and the halftone process are denoted as target raster lines LLs(i). Hereinafter the halftone processes for all of the ink colors (such as C, M, Y, K, LC, LM, DY) performed on the target raster lines LLs(i) shall be collectively termed a "process set" or "process group."

In FIG. 4, the two raster lines on which the color conversion process and the halftone process were carried out previously are denoted as reference raster lines LLs(i−1). The area Ad located above the target raster lines LLs(i) represents the area in which the color conversion process and the halftone process have already been carried out. The target raster lines LLs(i) and the area located below them, denoted as Ay, represent the area in which the color conversion process and the halftone process have not yet been carried out. The two raster lines LLs(i+1) are the area in which the color conversion process and the halftone process will be carried out next after the target raster lines LLs(i).

When carrying out the color conversion process and the halftone process, first, in Step S110 of FIG. 3, color conversion is performed. Specifically, with reference to the color conversion table 104 (see FIG. 1), data of the target raster lines LLs(i) represented by red (R), green (G) and blue (B) tone values is converted to data represented by cyan (C), magenta (M), yellow (Y), black (K), light cyan (LC), light magenta (LM), and dark yellow (DY) tone values. Then, in Step S120, the data of the target raster lines LLs(i) represented by C, M, Y, K, LC, LM and DY tone values is stored in the buffer.

In Step S300 (indicated by the broken line in FIG. 3), the halftone processes are carried out. The halftone processes for C, M, Y, K, LC, LM and DY are assigned to the two threads respectively in ink color units and performed. Prior to Step S300, the two threads have already been created and are in wait states. On the contrary, thread creation could be carried out each time when the step of color conversion process is performed. Where threads are created in advance, processing can commence in a shorter time, which is more effective.

In Step S130, halftone processes for each ink color are assigned to the two threads. Hereinafter a halftone process for an individual ink color is termed a "unit process" or "unit HT process." The details of the process will be described later, Here, as a result of the assignments made in Step S130 for example, the cyan, black, and magenta unit HT processes are assigned to the first thread, and the light cyan, light magenta, yellow, and dark yellow unit HT process are assigned to the second thread.

In Step S140 the first thread in the wait state now goes to the execute state. In Step S150, in the first thread, halftone processes are carried out for cyan, black, and magenta for example. When halftone processes for these ink colors have finished, in Step S160, the first thread goes to the wait state. In Step S150, the time needed by the halftone processes for cyan, black, and magenta is counted, and stored in the load memory 105 in the computer 90 memory (see FIG. 1).

Meanwhile in Step S170 the second thread in the wait state now goes to the execute state. In Step S180, in the second thread, halftone processes are carried out for light cyan, light magenta, yellow, and dark yellow, for example. When halftone processes for these ink colors have finished, in Step S190, the second thread goes to the wait state. In Step S180, the time needed by the halftone processes for light cyan, light magenta, yellow, and dark yellow is counted, and stored in the load memory 105 in the computer 90 memory.

In Step S200, a determination is made as to whether the color conversion and halftone processes have been completed for all raster lines included in the image data MID1. In the event that the color conversion and halftone processes have not been completed for all raster lines, the two raster lines LLs(i+1) situated adjacently below the raster lines LLs(i) just processed are designated as the new target raster lines (see FIG. 4), and the process beginning with Step S110 is repeated. In the event that the color conversion and halftone processes have been completed for all raster lines, the process terminates. The process of Step S130 is executed by an assigning unit 99a which is a functional portion of the halftone module 99; the processes of Steps S140-S160 and Steps S170-S190 are executed by a binarization unit 99b which is a functional portion of the halftone module 99. These functional portions are shown in FIG. 1.

Figure 5:
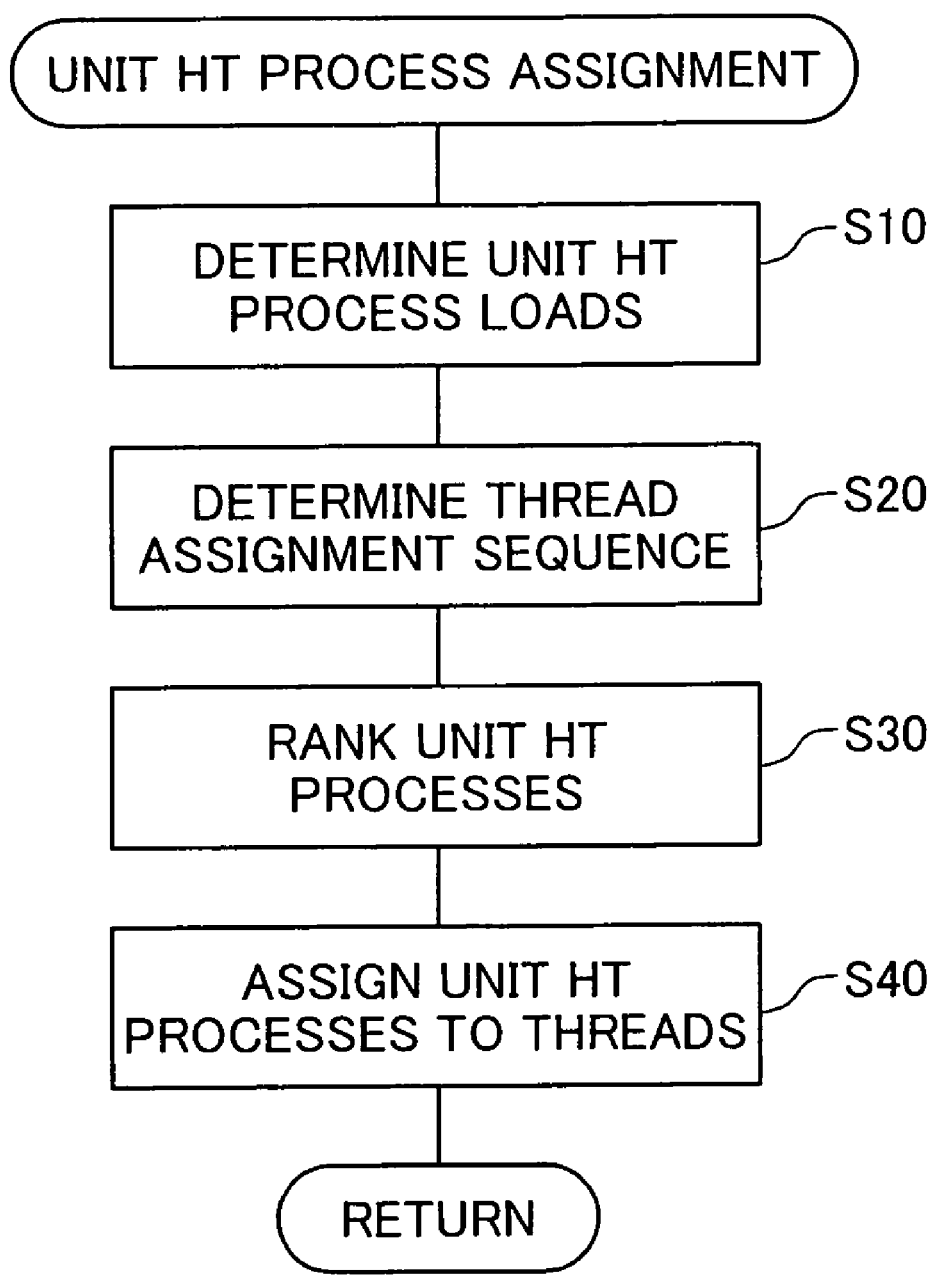
FIG. 5 is a flowchart showing the procedure for assigning unit HT processes for each color to threads in Step S130 of FIG. 3.

FIG. 5 is a flowchart showing the procedure for assigning unit HT processes for each color to threads in Step S130 of FIG. 3. In Step S10, first, the loads entailed by unit HT processes for the colors is estimated. Here, process times for the previous halftone processes, which process times have been stored in the load memory 105, are retrieved and designated as the unit HT process loads Lc, Lm, Ly, Lk, Llc, and Ldy. These represent process times of the unit HT processes when the reference raster lines LLs(i−1) were subjected to halftone processing. The subscripts c, m, y, k, lc, lm, dy appended to L represent respectively the ink colors cyan, magenta, yellow, black, light cyan, light magenta, and dark yellow.

In many cases, in an image, color components are present in similar proportions in adjacent areas. That is, in adjacent areas there is a high probability that the load entailed in halftone processes for a given color will be similar. Thus, it is possible to estimate load with accuracy by determining the load of the unit HT processes, as above mentioned, on the basis of process results of the reference raster lines LLs(i−1) on which halftone processes were performed immediately prior.

Figure 6:
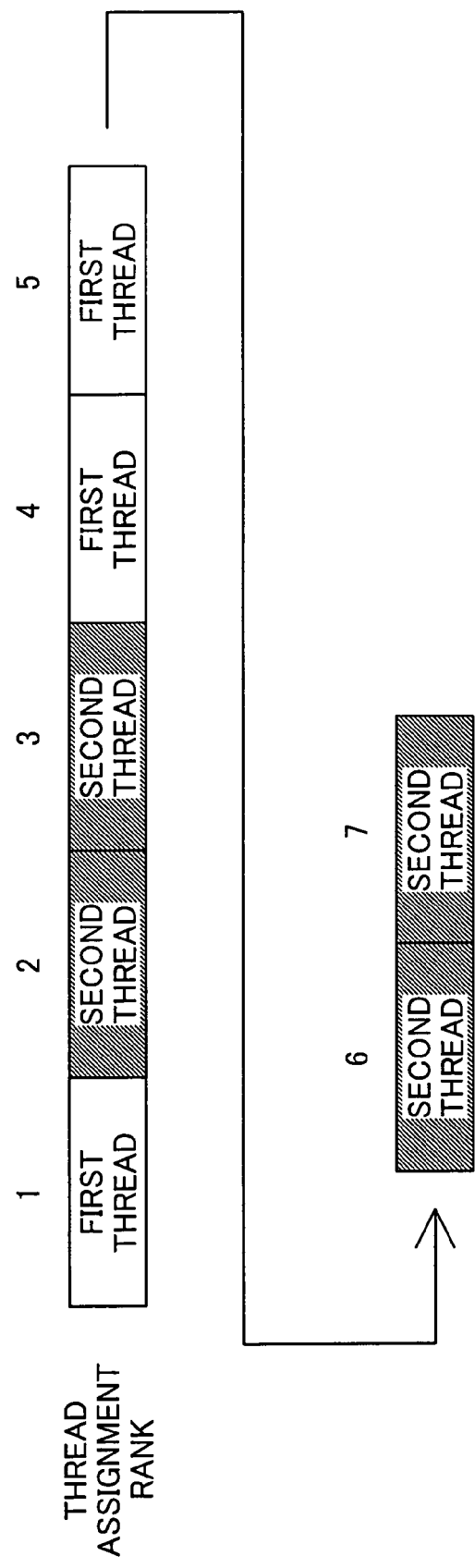
FIG. 6 is Illustration of the sequence for assigning unit HT processes to the first and second threads.

FIG. 6 is an illustration of the sequence for assigning unit HT processes to the first and second threads. In Step S20 of FIG. 5, a sequence for assigning unit HT processes to the first and second threads is determined. When assigning unit HT processes to processing modules, unit HT processes are assigned to the first and second threads in accordance with the sequence determined in Step S20. Specifically, as shown in FIG. 6, a first thread→second thread sequence and second thread→first thread sequence are repeated. As a result, after the first thread has been assigned to a first position, the first and second threads are lined up in respective pairs in the assignment order. In Step S20, the assignment order is determined in order from #1 to #7. The maximum sequence number #7 is equal to the number N of types of unit HT processes (=7), i.e. the number of ink colors N (=7).

Figure 7:
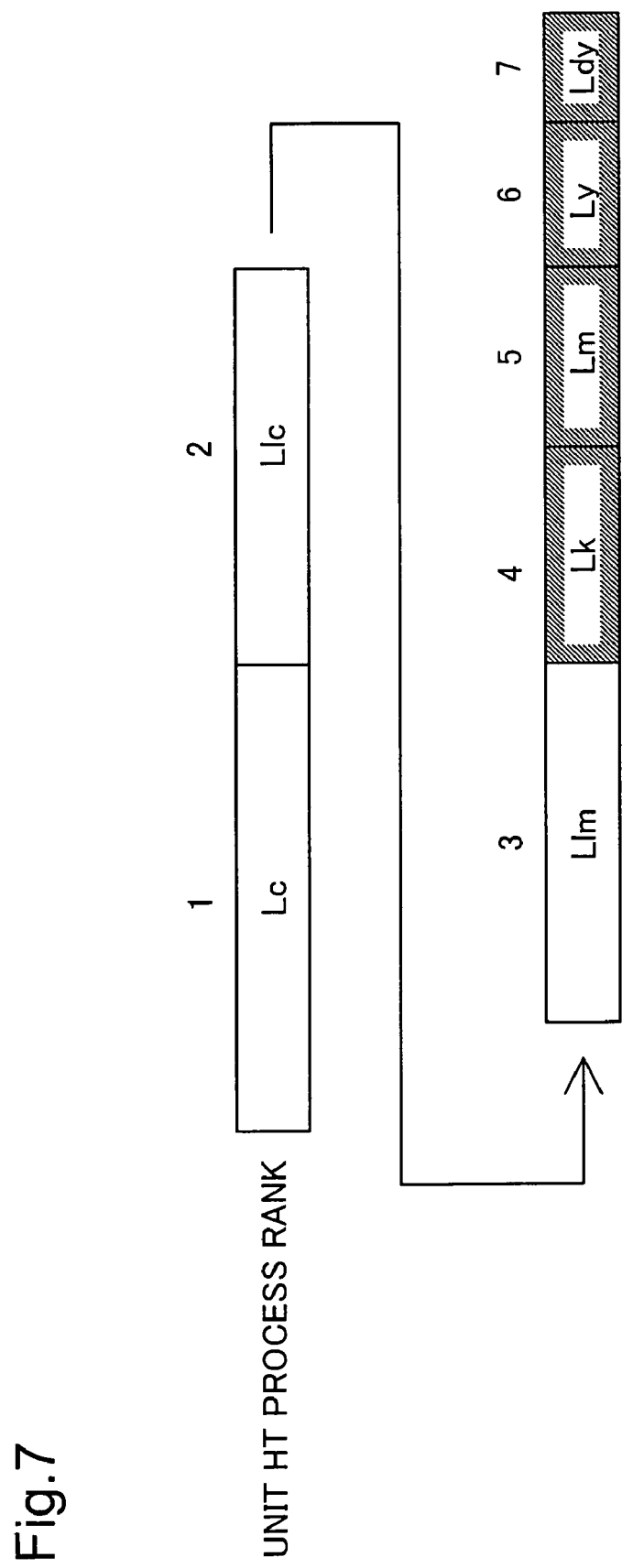
FIG. 7 illustrates unit HT processes sequenced according to load magnitude.

FIG. 7 is an illustration showing unit HT processes sequenced according to load magnitude. In Step S30, the assigning unit 99a of the halftone module 99 sequences the unit HT processes in order of increasing load of the unit HT processes as determined in Step S10. In FIG. 7, individual squares represent unit HT processes, with the length of squares in the left-right direction representing load magnitude. In FIG. 7, the load is higher going leftward. Numbers shown above each square representing the unit HT processes indicate the sequence of unit HT processes. In FIG. 7, the unit HT processes for which the halftone process is executed by means of the dither method, namely, the processes for black, magenta, yellow, and dark yellow, are shown with hatching.

Figure 8:
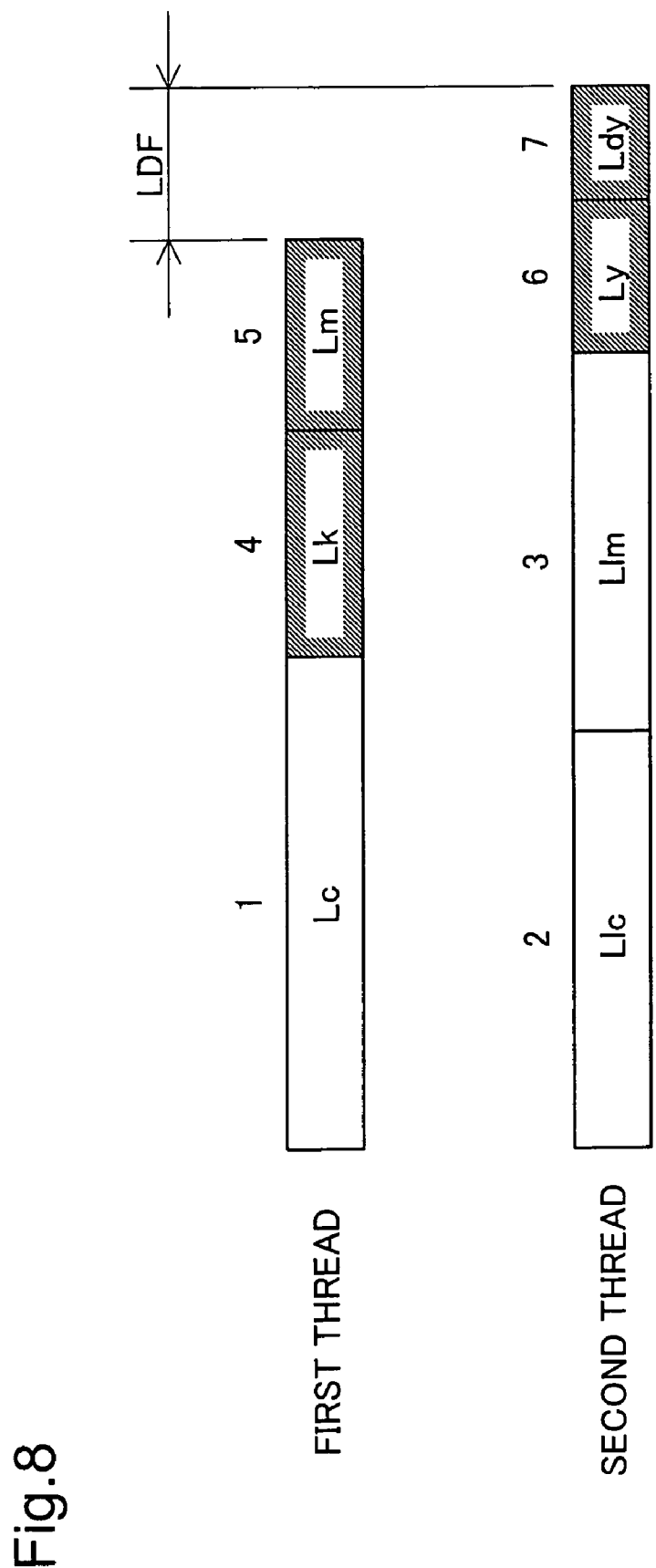
FIG. 8 illustrates unit HT processes assigned to the first and second threads.

FIG. 8 is an illustration showing unit HT processes assigned to the first and second threads. In Step S40 of FIG. 5, the assigning unit 99a of the halftone module 99 assigns the unit HT processes to the first and second threads, according to the thread assignment order determined in Step S30 and the unit HT process sequence determined in Step S40. Specifically, unit HT processes of i-th (i is an integer from 1 to N) priority rank is assigned to the i-th thread of the assignment order.

As a result, after the cyan unit HT process of the first rank has been assigned initially to the first thread, unit HT processes in groups of two are assigned alternately to the first thread and second thread, according to their priority rank (see FIG. 7). As a result, the cyan, black, and magenta unit HT processes are assigned to the first thread. The light cyan, light magenta, yellow, and dark yellow unit HT processes are assigned to the second thread. In FIG. 8, numbers shown above the squares representing individual unit HT processes indicate the rank of the unit HT process, determined in Step S30.

Assignment of color conversion process in Step S130 of FIG. 3 is executed as described hereinabove. In Steps S150, S180 of FIG. 3, unit HT processes assigned to each thread are executed in each thread, in order starting from left in FIG. 8. That is, unit HT processes assigned first during assignment to threads are executed first during the actual color conversion process as well. Alternatively, prior to execution of the unit HT processes in Steps S150, S180 of FIG. 3, an execution sequence for the unit HT processes could be determined according to a predetermined rule, and unit HT processes executed in that order in Steps S150, S180.

In Embodiment 1, unit HT processes are assigned to threads in order from the unit HT process having the largest load (see FIG. 7). Thus, the load differential LDF between threads (see FIG. 8) can be minimized.

When assigning unit HT processes to the first and second threads, if unit HT processes are assigned repeatedly in first thread→second thread order, problems such as the following will occur. Specifically, the first thread, to which unit HT processes are always assigned prior to the second thread, will have assigned to it larger unit HT processes than the second thread, to which unit HT processes are assigned after the first thread. As a result, the load of the first thread will be greater than the load of the second thread.

In Embodiment 1, however, assignments are made by the following method, with basic ranks in which the first thread is ranked as number one, and the second thread is ranked as number two. Specifically, assignments are made while repeatedly alternating between an order going from the processing module with the highest basic rank to the processing module with the lowest, and an order going from the processing module with the lowest basic rank to the processing module with the highest. Thus, the likelihood of the load of the first thread exceeding the load of the second thread, and the likelihood of the load of the second thread exceeding the load of the first thread, are close to equal. The method for assigning unit processes to processing modules (threads) according to repeated ascending and descending order of basic rank can be one similar to that implemented where the processing modules (threads) number three or more. As a result of implementation, similar advantages are produced.

B. Embodiment 2.

In Embodiment 2, the unit HT process to be executed next is determined, while the unit HT process for an ink color is actually being executed. Specifically, one unit HT process is newly assigned to the thread which is first to complete unit HT processes already assigned. In other respects, it is the same as Embodiment 1. In the following description, loads of the unit HT processes are assumed to be the same as in Embodiment 1.

Figure 9:
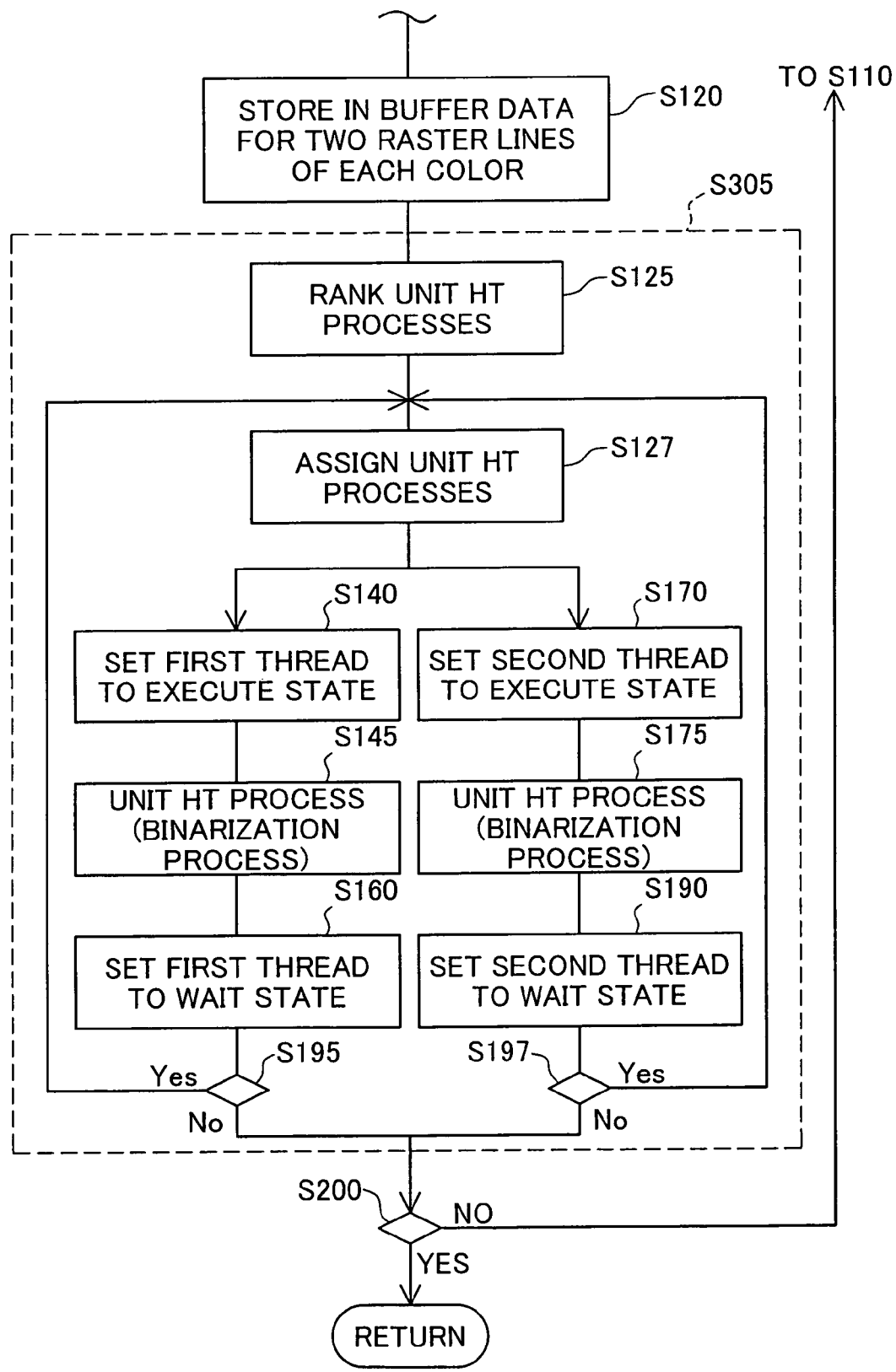
FIG. 9 is a flowchart showing specific flow of the color conversion process and the halftone process in Embodiment 2.

FIG. 9 is a flowchart showing specific flow of the color conversion process and the halftone process in Embodiment 2. In the flowchart, procedures other than Step S305 shown enclosed by broken lines are the same as the procedures of FIG. 3 of Embodiment 1.

In Step S125, the loads of the unit HT processes for ink colors are determined, and unit HT processes are ranked in order of largest load. The method for determining load is the same as the procedure of Step S10 of FIG. 5 in Embodiment 1. The ranking method is the same as the procedure of Step S20 of FIG. 5 in Embodiment 1 (see FIG. 7).

In Step S127, a unit HT process is selected from among unit HT processes not yet assigned to any thread, and is assigned to a thread that does not currently have a unit HT process being executed. During this time, assignments are made in order from the highest priority rank (see FIG. 7), in the same manner as in Embodiment 1.

Figure 10:
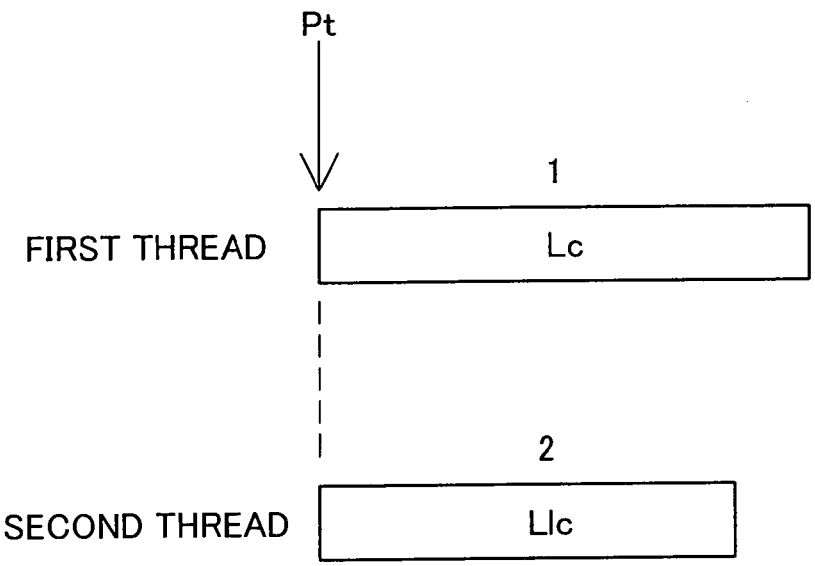
FIG. 10 illustrates unit HT processes assigned to threads in Step S127.

FIG. 10 is an illustration showing unit HT processes assigned to threads in Step S127. In FIG. 10, individual squares represent unit HT processes, with the length of squares in the left-right direction representing load magnitude. Current time is indicated by Pt. This convention is used in the drawings hereinbelow as well. When initially carrying out the process of Step S127, no unit HT process has yet been assigned to the first and second threads. Thus, in Step S127, the cyan unit HT process, which of all the unit HT processes is first in priority rank (see FIG. 7), is assigned to the first thread. The light cyan unit HT process, which is second in priority rank, is assigned to the second thread. In FIG. 10, numbers given above the squares that represent the unit HT processes indicate the rank of each unit HT process.

The following discussion pertains to processes relating to the first thread. In Step S140 of FIG. 9, the first thread goes to the execute state. The process in Step S140 is the same as that of Step S140 of the flowchart of FIG. 3 in Embodiment 1. In Step S145, the cyan unit HT process assigned to the first thread is executed. When the unit HT process is completed, in Step S160, the first thread goes into wait mode. The process in Step S160 is the same as in Embodiment 1.

In Step S195, a determination is made as to whether there are any unit HT processes that have not yet been assigned to a thread. In the event that there is a unit HT process or processes that have not yet been assigned to a thread, the routine returns to Step S127. In the event that all unit HT processes have been assigned to the first or second threads, the routine proceeds to Step S200. In Step S200, a determination is made as to whether color conversion processes and halftone processes have been completed for all raster lines contained in the image data MID1. Subsequent processes are the same as in Embodiment 1.

The procedures in Steps S170-S197 relating to the second thread are respectively the same as the procedures in Steps S140-S195 relating to the first thread. In Step S197, in the event that there is a unit HT process or processes that have not yet been assigned to a thread, the routine returns to Step S127. In the event that all unit HT processes have been assigned to the first or second threads, the routine proceeds to Step S200. Here, because of estimated load magnitude relationships (see FIG. 10), The second thread has completed the light cyan unit HT process before the first thread has completed the cyan unit HT process.

Figure 11:
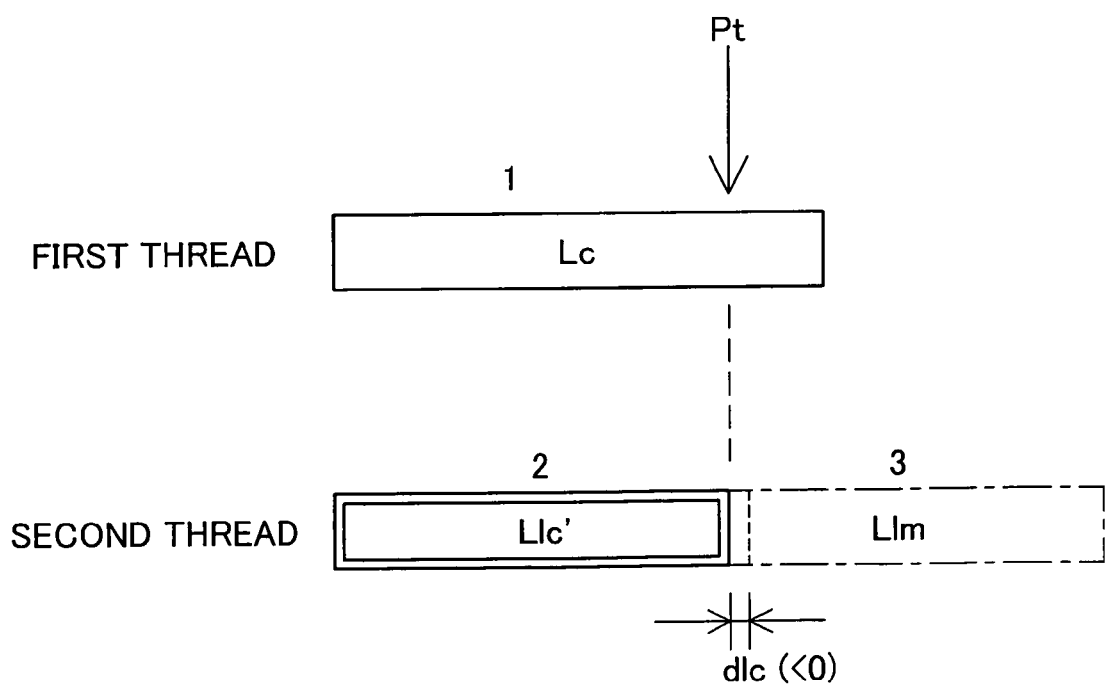
FIG. 11 illustrates a condition in which a light magenta unit HT process has been newly assigned to the second thread which has completed its assigned unit HT process.

FIG. 11 is an illustration showing a condition in which a light magenta unit HT process has been newly assigned to the second thread, which was the first to complete its previously assigned unit HT process. Returning to Step S127 from Step S195 or Step S197 of FIG. 9, in Step S127, a halftone process that has not yet been assigned to a thread is assigned to a thread that does not have a unit HT process currently being executed. Here, the light magenta unit HT process, which has the highest priority rank among unit HT processes that have not yet been assigned, is now assigned to the second thread which was first to complete its unit HT process. At the current point in time, indicated by Pt in the drawing, the first thread is still executing the cyan unit HT process.

In FIG. 11, the unit HT process that has already been completed is indicated by a square drawn with double lines, and the newly assigned unit HT process is indicated by a square drawn with dot-and-dash lines. The actual processing time (load) for the completed unit HT process is in most cases different from the pre-estimated load. Actual load is denoted by a "'." This convention is employed in other drawings hereinbelow as well.

In FIG. 11, estimated load for the light cyan unit HT process is indicated by broken lines. The differential between estimated load and actual process time is denoted as dlc. The subscript lc appended to the letter d denotes the ink color. Since the light cyan unit HT process was completed in a shorter time than the estimated load, dlc is a negative value.

Subsequently, the unit HT process assigned to the thread is processed in Steps S140-S195, or Steps S170-197. The subsequent procedure is similar.

Figure 12:
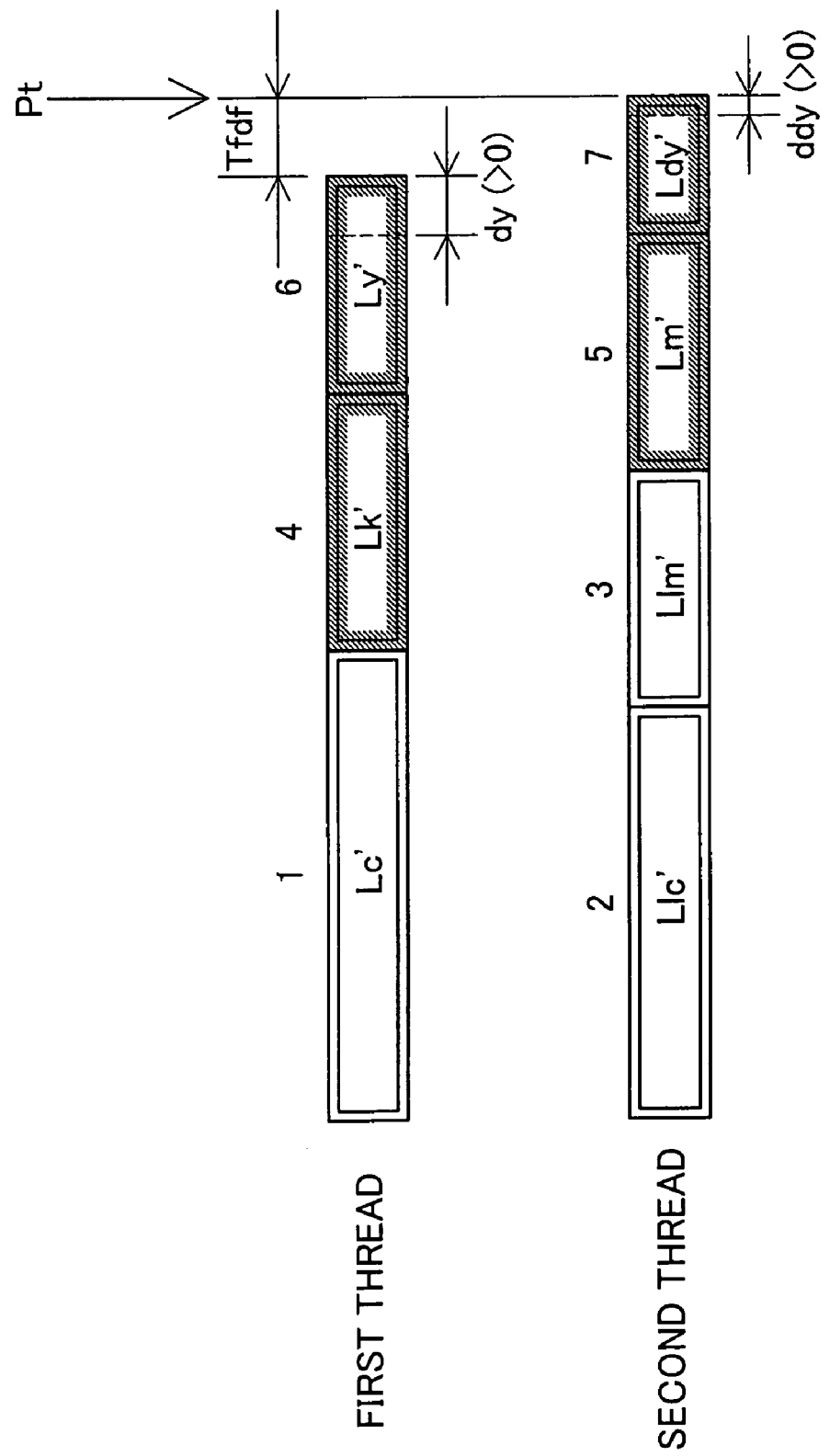
FIG. 12 illustrates a condition in which all unit HT processes have been completed.

FIG. 12 is an illustration showing a condition in which all unit HT processes have been completed. In FIG. 12, as in FIG. 7 and FIG. 8, the black, magenta, yellow, and dark yellow unit HT processes, about which halftone processes are carried out by the dither method, are shown with hatching. As shown in FIG. 12, the yellow unit HT process requires more time to complete (i.e. by dy) than the estimated load Ly. The dark yellow unit HT process requires more time to complete (i.e. by ddy) than the estimated load Ldy. In Embodiment 2, Tfdf is the differential in completion time by the first thread and the second thread.

As will be apparent from comparison with FIG. 8 of Embodiment 1, whereas with the manner of assignment according to Embodiment 1, the magenta unit HT process was assigned to the first thread (see Lm in FIG. 8), with Embodiment 2, it is assigned to the second thread (see Lm' of FIG. 12). Also, whereas with the manner of assignment according to Embodiment 1, the yellow unit HT process was assigned to the second thread (see Ly of FIG. 8), with Embodiment 2, it is assigned to the first thread (see Ly' of FIG. 12).

In Embodiment 2, a unit HT process is newly assigned to the thread which is first to actually complete a process. Thus, the next unit HT process can be newly assigned to a thread which clearly has been assigned a smaller actual load of the unit HT processes up to that point. Thus, when assigning unit HT processes to processing modules so as to minimize variability in load among threads, it is unlikely that deviation between estimated load and actual processing time will have any effect.

C. Embodiment 3

In Embodiment 3, the unit HT processes are grouped into two groups. The unit HT processes in a first process group are assigned to the threads first and then the unit HT processes in a second process group are assigned. In other respects, it is the same as Embodiment 1.

Figure 13:
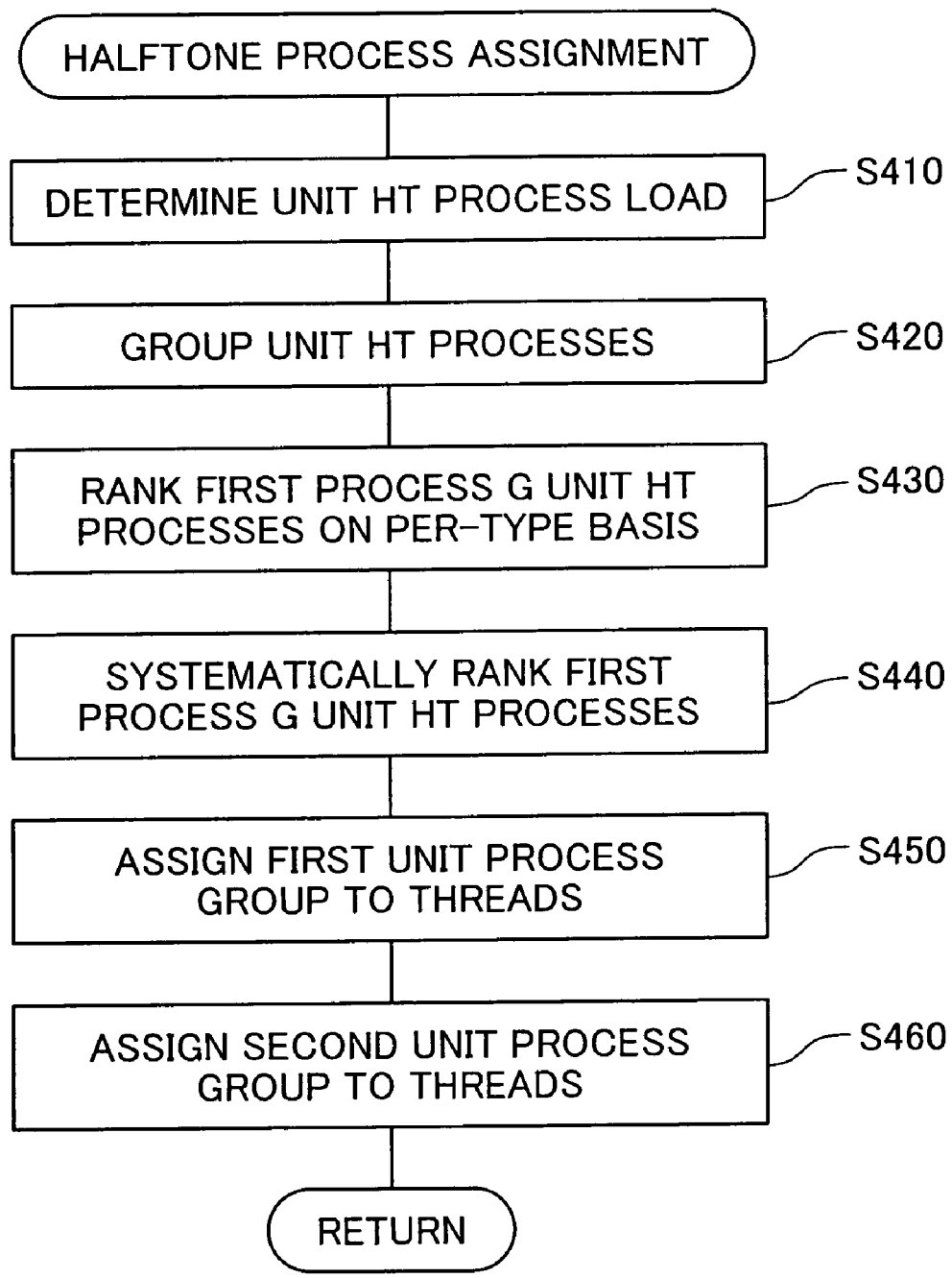
FIG. 13 is a flowchart showing the procedure for assigning unit HT processes for each color to threads in Step S130 of FIG. 3.

FIG. 13 is a flowchart showing the procedure for assigning unit HT processes to threads in Step S130 of FIG. 3. In Step S410, the loads of the unit HT processes for ink colors are determined. The method for determining load is the same as the procedure of Step S10 of FIG. 5 in Embodiment 1.

In Step S420 of FIG. 13, the unit HT processes of the colors are grouped into a first process group and a second process group. Specifically, the two unit HT processes with the smallest loads are placed in the second process group, and the other unit HT processes are placed in the first process group. Here, of unit HT processes that undergo color conversion by means of the dither method, which places a lighter load on the system than does the error diffusion method, the yellow and dark yellow unit HT processes are grouped into the second process group, and other unit HT processes are grouped into the first process group.

The halftone module 99 performs halftone processing by the error diffusion method for light cyan (LC), light magenta (LM), and cyan (C), while performs halftone processing by the dither method for magenta (M), yellow (Y), black (K), and dark yellow (DY). Unit HT processes that undergo color conversion by means of the error diffusion method are termed "first type unit HT processes" while unit HT processes that undergo color conversion by means of the dither method are termed "second type unit HT processes."

Figure 14:
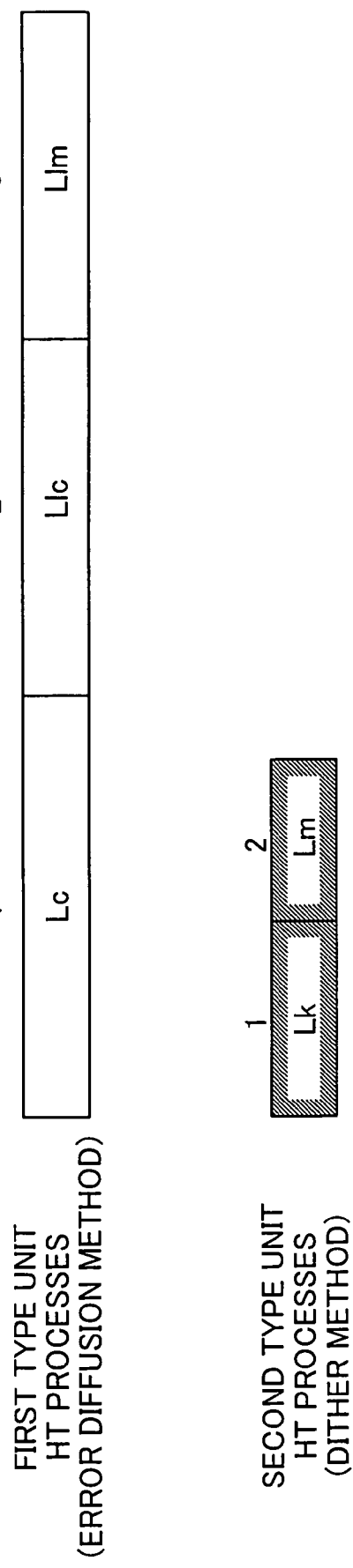
FIG. 14 illustrates first type unit HT processes and second type unit HT processes assigned on the basis of load level.

FIG. 14 is an illustration showing first type unit HT processes and second type unit HT processes sequenced according to load magnitude. In Step S430, the halftone module 99 sequences the unit HT processes respectively within the first type unit HT processes and the second type unit HT processes. The unit HT processes are sequenced in order of largest load level as determined in Step S10. first process groupIn FIG. 6, individual squares represent unit HT processes, with the length of squares in the left-right direction representing load magnitude. In FIG. 6, load increases going leftward. Numbers shown above each square representing the unit HT processes indicate rank within first type unit HT processes and within second type unit HT processes. Second type unit HT processes are indicated by hatching.

Figure 15:
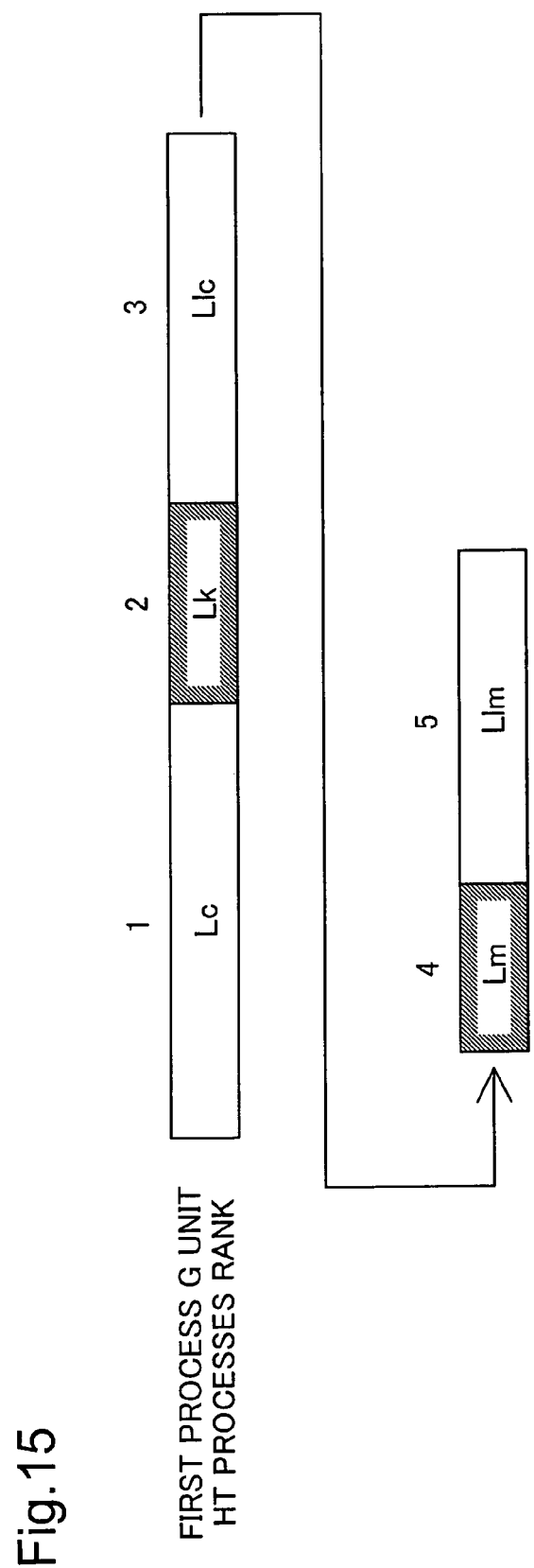
FIG. 15 illustrates ranked unit HT processes of the first process group.

FIG. 15 is an illustration showing ranked unit HT processes of the first process group. In Step S440 of FIG. 13, the halftone module 99, on the basis of per-type rankings performed in Step S430, systematically assigns ranks to all of the unit HT processes that have been grouped into the first process group. Specifically, beginning with first type halftone processes which undergo halftone processing by the error diffusion method, ranks are assigned alternately to first type and second type unit HT processes, in order of largest load. In FIG. 7, numbers shown above each square representing unit HT processes indicate rank of the unit HT processes.

Figure 16:
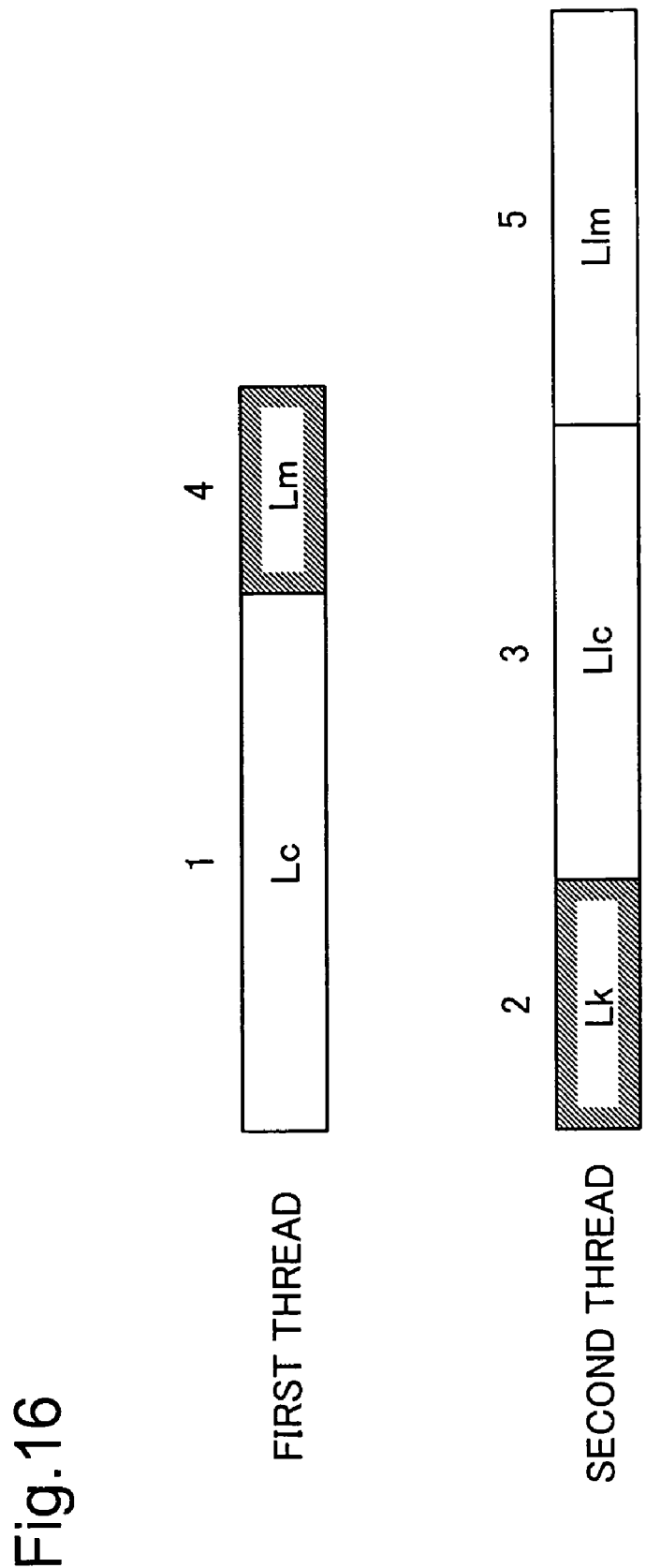
FIG. 16 illustrates unit HT processes of the first process group, assigned to the first and second threads.

FIG. 16 is an illustration showing unit HT processes of the first process group, assigned to the first and second threads. In Step S450 of FIG. 13, the halftone module 99 assigns unit HT processes of the first process group to the first thread and the second thread, according to their rank as determined in Step S40. Specifically, after the first ranking unit HT process of the first process group has initially been assigned to the first thread, unit HT processes of the process group are assigned, according to priority rank, to the thread having the smallest total load of unit HT processes previously assigned to it. As a result, as shown in FIG. 16, unit HT processes are assigned to the first and second thread. In FIG. 16, numbers shown above each square representing unit HT processes indicate rank of the unit HT processes as determined in Step S440.

In Step S440, first type and second type unit HT processes are ranked alternately in order of largest load. Thus, by assigning unit HT processes to the first thread and the second thread in the above manner, assignment is executed in the following manner. Specifically, of unit HT processes that has not yet been assigned to a thread and whose halftone process method differs from that of the unit HT process assigned just prior to the thread, the unit HT process having the largest load is assigned to the thread having the smallest total load of unit HT processes previously assigned to it.

Figure 17:
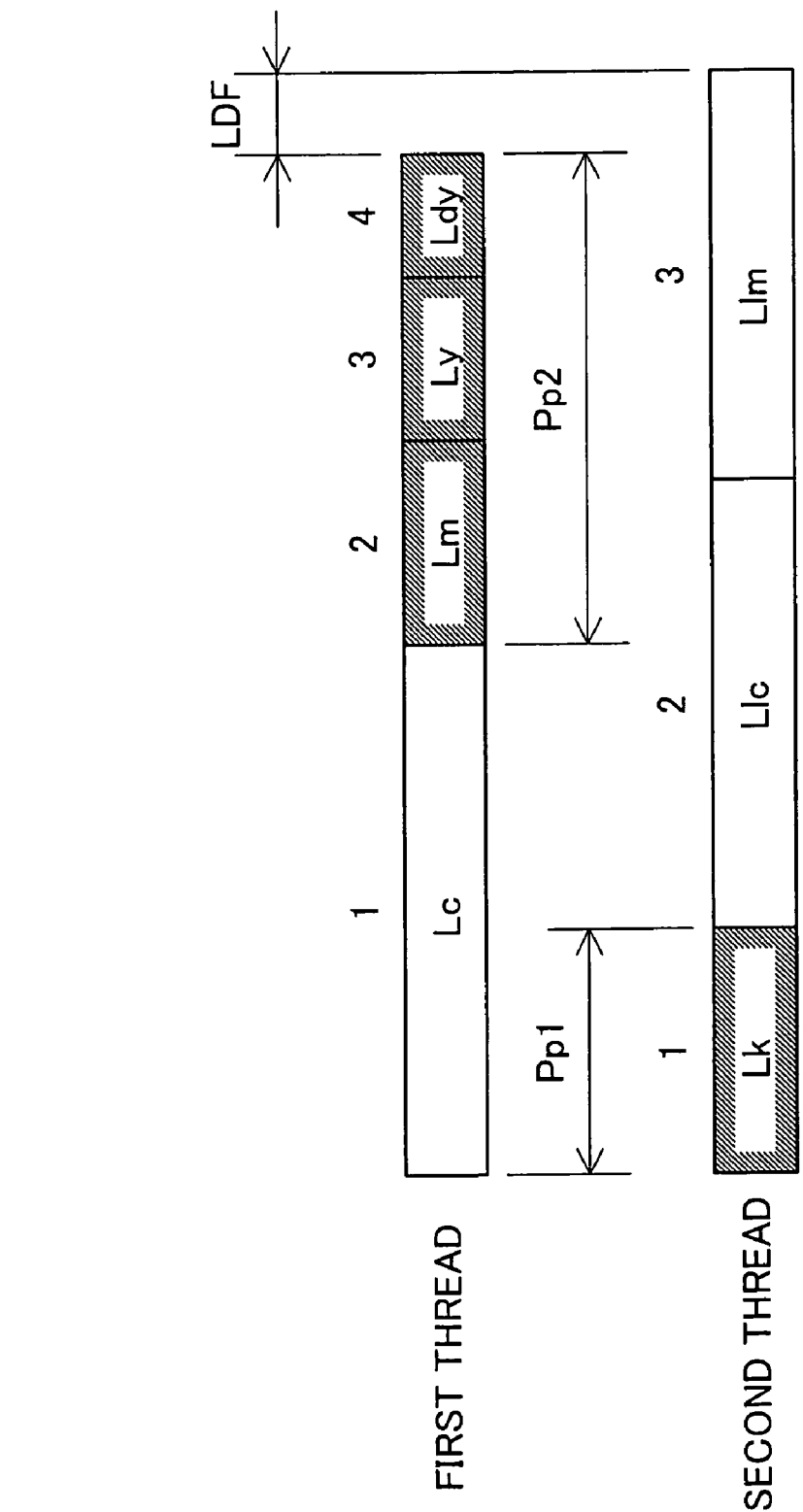
FIG. 17 illustrates first and second process group unit HT processes assigned to the first and second threads.

FIG. 17 is an illustration showing first and second process group unit HT processes assigned to the first and second threads. In Step S460 of FIG. 13, the halftone module 99 assigns unit HT processes of the second process group to the first thread and the second thread. Specifically, unit HT processes are assigned in order to largest load, to the thread having the smallest total load of unit HT processes assigned to it up to that point. As a result, as shown in FIG. 17, unit HT processes are assigned to the first and second threads.

In Embodiment 3, assignment of color conversion processes in Step S130 of FIG. 3 is executed in the manner described above. In Step S150, S180 of FIG. 3, unit HT processes that have been assigned to threads are executed in each thread, from the left in the order in which they are shown in FIG. 17. That is, unit HT processes assigned first during assignment to threads are executed first during the actual color conversions process.

In Embodiment 3, unit HT processes of the second process group having small load are assigned to threads after the first process group having large load. Then, within the second process group, unit HT processes are assigned in order of highest load, to the thread having the smallest total load of unit HT processes assigned to it up to that point. Thus, the load differential LDF among threads (see FIG. 17) can be minimized.

Halftone processing by means of the error diffusion method executed in unit HT processes of the first type has more condition branches than does halftone processing by means of the dither method. Thus, in halftone processing by means of the error diffusion method, the CPU cannot use instructions and data read ahead in advance and stored in cache memory. Consequently, the CPU frequently reads instructions and data from the main memory. As a result, during execution of processes, it is necessary to wait for data to be transferred from main memory, and processing efficiency of the CPU is lower as compared to the case where instructions and data stored in cache memory in advance can be used. In parallel processing by means of hyper-threading technology, where both of two threads execute halftone processing by means of the error diffusion method, there are many instances in which both threads must wait for data to be transferred from main memory, so that processing comes to a halt.

On the other hand, halftone processing by means of the dither process executed in unit HT processes of the second type has fewer condition branches than does halftone processing by means of the error diffusion method. Thus, in halftone processing by means of the dither method, the CPU can use instructions and data read ahead in advance and stored in cache memory. Therefore, in parallel processing by means of hyper-threading technology, where halftone processing by means of the error diffusion method is executed in one thread, while execution by means of the dither method takes place in the other thread, the possibility of the halt is reduced. Specifically, during the interval that halftone processing by means of the error diffusion method is waiting for data to be transferred from main memory, the other process by means of the dither method can proceed using instructions and data stored in the cache memory. As a result, processing efficiency can be improved, and halftone processing for all colors can be completed in a short time.

In Embodiment 3, in Step S440, beginning with unit HT processes of the first type, unit HT processes of the first type and second type, in order of largest load, are ranked within the first process group. Next, in Step S450, after initially assigning one unit HT process to the first thread, unit HT processes of the first process group are assigned, in order of rank of Step S440, to the thread having the smallest total load of unit HT processes assigned to it previously. By means of such an embodiment, unit HT processes of the first type carried out by means of the error diffusion method and unit HT processes of the second type carried out by means of the dither method are likely to be processed in parallel by two threads. As a result, computer resources are utilized effectively, and as a result processing efficiency is increased.

Where overhead during process switching is ignored, FIG. 17 can be understood as a Gantt chart. First type unit HT processes and second type unit HT processes are processed in parallel, for time intervals indicated by Pp1, Pp2 in FIG. 17.

In Embodiment 3, assignment of unit HT processes to threads is carried out selectively to the first process group and the second process group. Thus, while reducing variability in load between threads by assignment of the second process group, it is possible at the same time to achieve the additional object of higher efficiency of unit HT processes through assignment of the first process group.

D. Embodiment 4

In Embodiment 4, the unit HT process to be executed next is determined while the unit HT process for an ink color is actually being executed as Embodiment 2. Other respects, including the method for determining unit HT process load and the ranking method (see Steps S410-440 of FIG. 13), are the same as in Embodiment 3. In the following description, it is assumed that unit HT processes identical to those in Embodiment 3 assigned to the threads.

Figure 18:
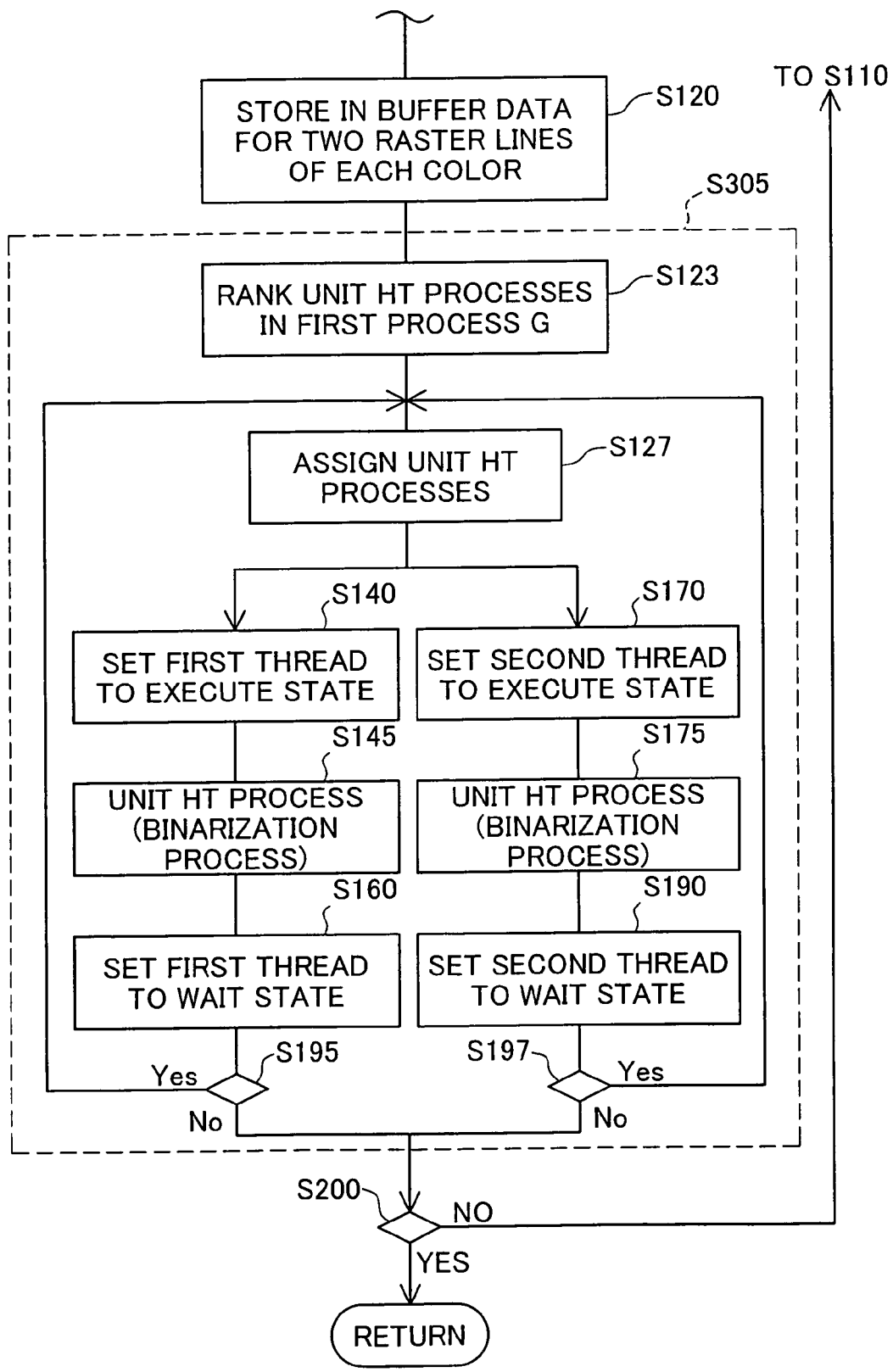
FIG. 18 is a flowchart showing specific flow of the color conversion process and the halftone process in Embodiment 4.

FIG. 18 is a flowchart showing specific flow of the color conversion process and the halftone process in Embodiment 4. In the flowchart, procedures other than Step S123 are the same as the procedures of FIG. 9 of Embodiment 2.

In Step S123, ranks are assigned to the unit HT processes of the ink colors. The ranking method is the same as the procedure of Steps S410-S440 of FIG. 13 in Embodiment 3 (see FIG. 14 and FIG. 15).

Figure 19:
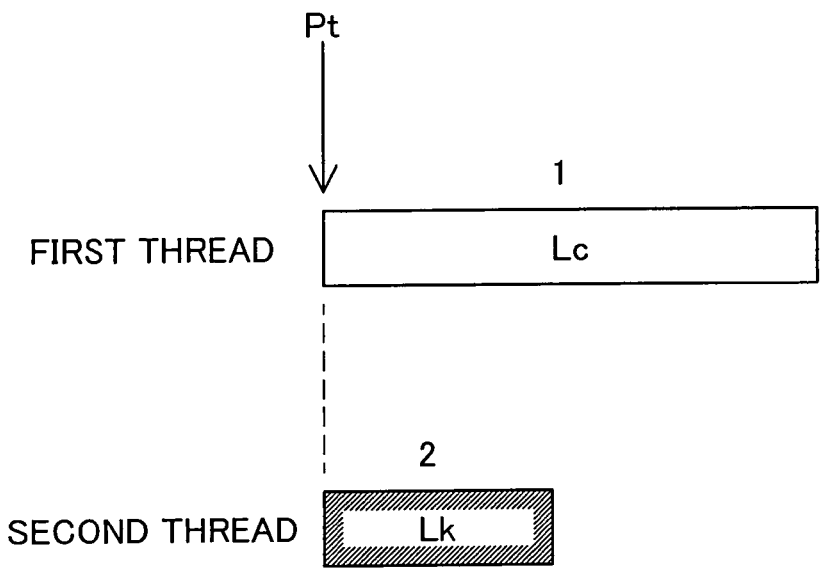
FIG. 19 illustrates unit HT processes assigned to threads in Step S127 of FIG. 18.

FIG. 19 is an illustration showing unit HT processes assigned to threads in Step S127 of FIG. 18. In the drawing, current time is indicated by Pt. When initially carrying out the process of Step S127, no unit HT process has yet been assigned to the first and second threads. Thus, in Step S127, the cyan unit HT process, which of all the unit HT processes is first in priority rank within the first process group (see FIG. 15), is assigned to the first thread, and the black unit HT process which is second in priority rank is assigned to the second thread. In FIG. 19, numbers given above the squares that represent the unit HT processes indicate the rank of each unit HT process. In the drawings hereinbelow as well, unit HT processes of the second type processed by the dither method are indicated by hatching.

Figure 20:
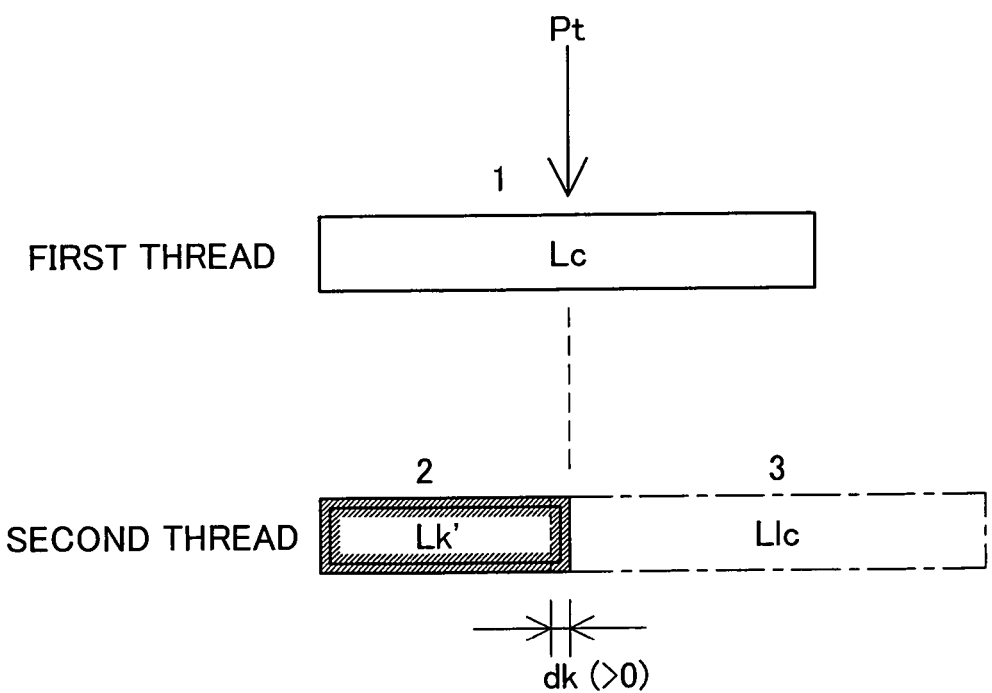
FIG. 20 illustrates a condition in which a light magenta unit HT process has been assigned to the second thread which has completed its assigned unit HT process.

FIG. 20 is an illustration showing a condition in which a light cyan unit HT process has been newly assigned to the second thread, which was the first to complete its previously assigned unit HT process. Returning to Step S127 from Step S195 or Step S197 of FIG. 18, in Step S127, a halftone process that has not yet been assigned to a thread is assigned to a thread that does not have a unit HT process currently being executed. At this stage, a unit HT process of the first process group is present among the halftone processes that have not yet been assigned to a thread. Thus, the light cyan unit HT process, which has the highest priority rank among unit HT processes that have not yet been assigned, is now assigned to the second thread which was first to complete its unit HT process.

In FIG. 20, the unit HT process that has already been completed is indicated by a square drawn with double lines, and the newly assigned unit HT process is indicated by a square drawn with dot-and-dash lines. Actual load is denoted by a "." At the current point in time, indicated by Pt in the drawing, the first thread is still executing the cyan unit HT process.

In FIG. 20, with regard to the black unit HT process, the estimated load is indicated by broken lines. The differential between estimated load and actual process time is denoted as dk. The subscript k appended to the letter d denotes the ink color. Since the black unit HT process required more time than the estimated load, dk is a positive value.

Subsequently, the unit HT process assigned to the thread is processed in Steps S140-S195, or Steps S170-197.

Figure 21:
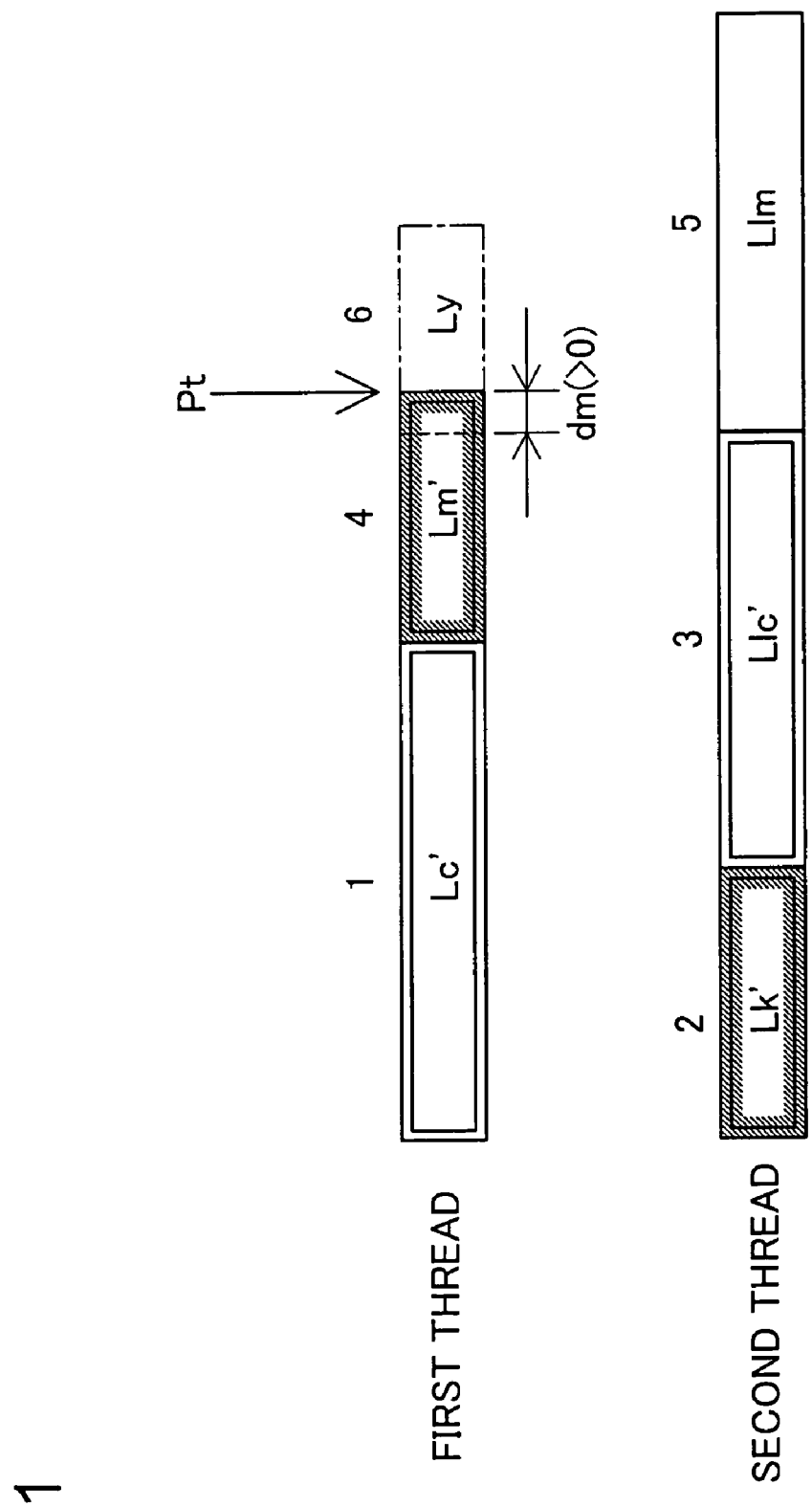
FIG. 21 illustrates a condition in which a yellow unit HT process has been newly assigned to the first thread which has completed its assigned unit HT process.

FIG. 21 is an illustration showing a condition in which a yellow unit HT process has been newly assigned to the first thread, which has completed the unit HT processes assigned to it up to that point. At the current point in time indicated by Pt in the drawing, the first process group has already been assigned to threads (see FIG. 15). Therefore, subsequently in Step S127 of FIG. 18, the unit HT process that, of the unit HT processes included in the second process group, has the largest load is assigned to a thread. Here, the yellow unit HT process is assigned to the first thread.

Figure 22:
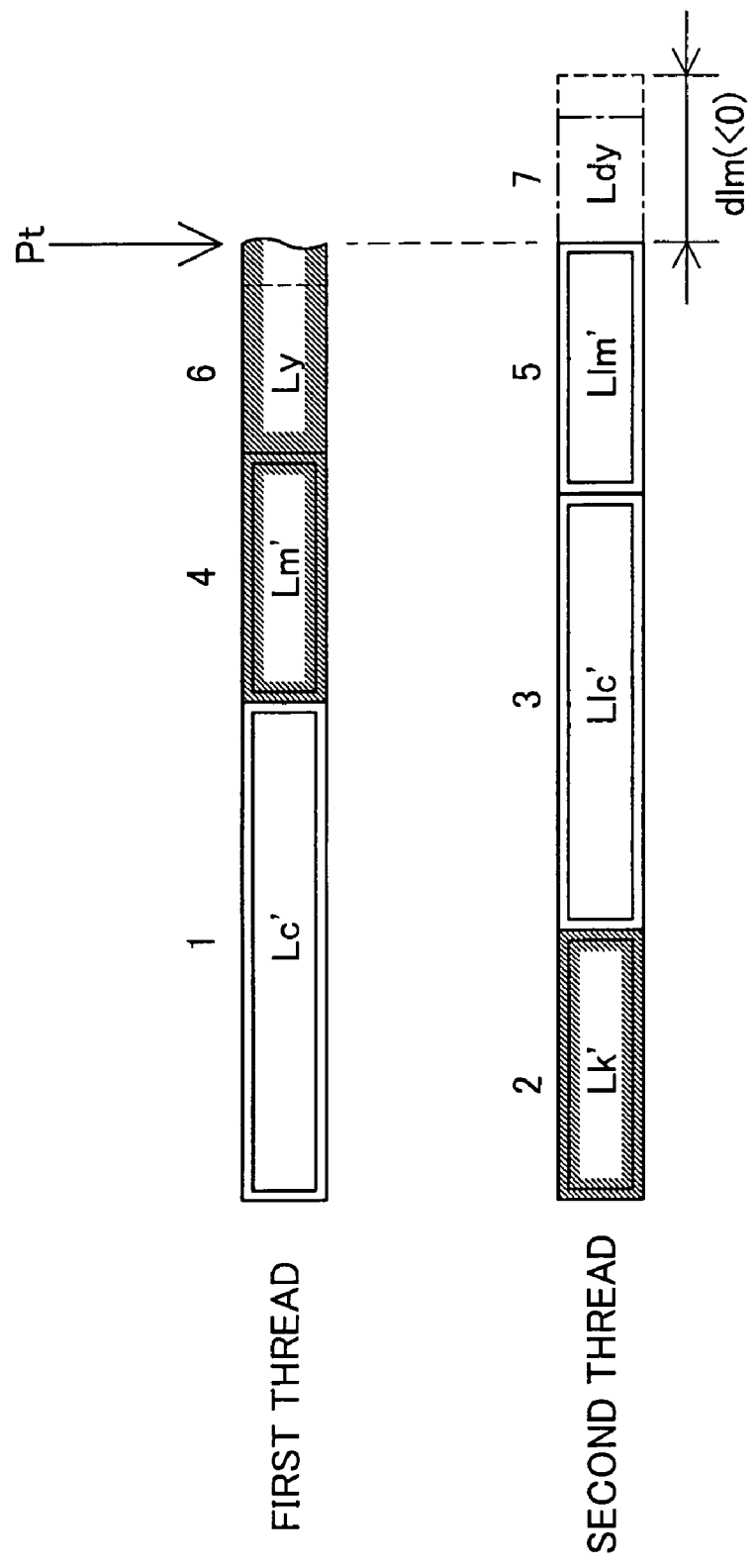
FIG. 22 illustrates a condition in which a dark yellow unit HT process has been newly assigned to the second thread which has completed its assigned unit HT process.

FIG. 22 is an illustration showing a condition in which a dark yellow unit HT process has been newly assigned to the second thread, which has completed the unit HT processes assigned to it up to that point. As shown in FIG. 21 and FIG. 22, whereas the yellow unit HT process takes a longer time than the estimated load, the light magenta unit HT process takes less time than the estimated load (see dlm in FIG. 22). The estimated load of the light magenta unit HT process is indicated by broken lines in FIG. 22, and actual processing time is indicated by double lines. The estimated load of the yellow unit HT process is indicated by broken lines in FIG. 22, and actual processing time is indicated by a solid straight line and a wavy line, since the process is not yet completed.

As shown in FIG. 22, the light magenta unit HT process in the second thread is completed before the yellow unit HT process in the first thread. Thus, the final remaining dark yellow unit HT process is newly assigned to the second thread.

Figure 23:
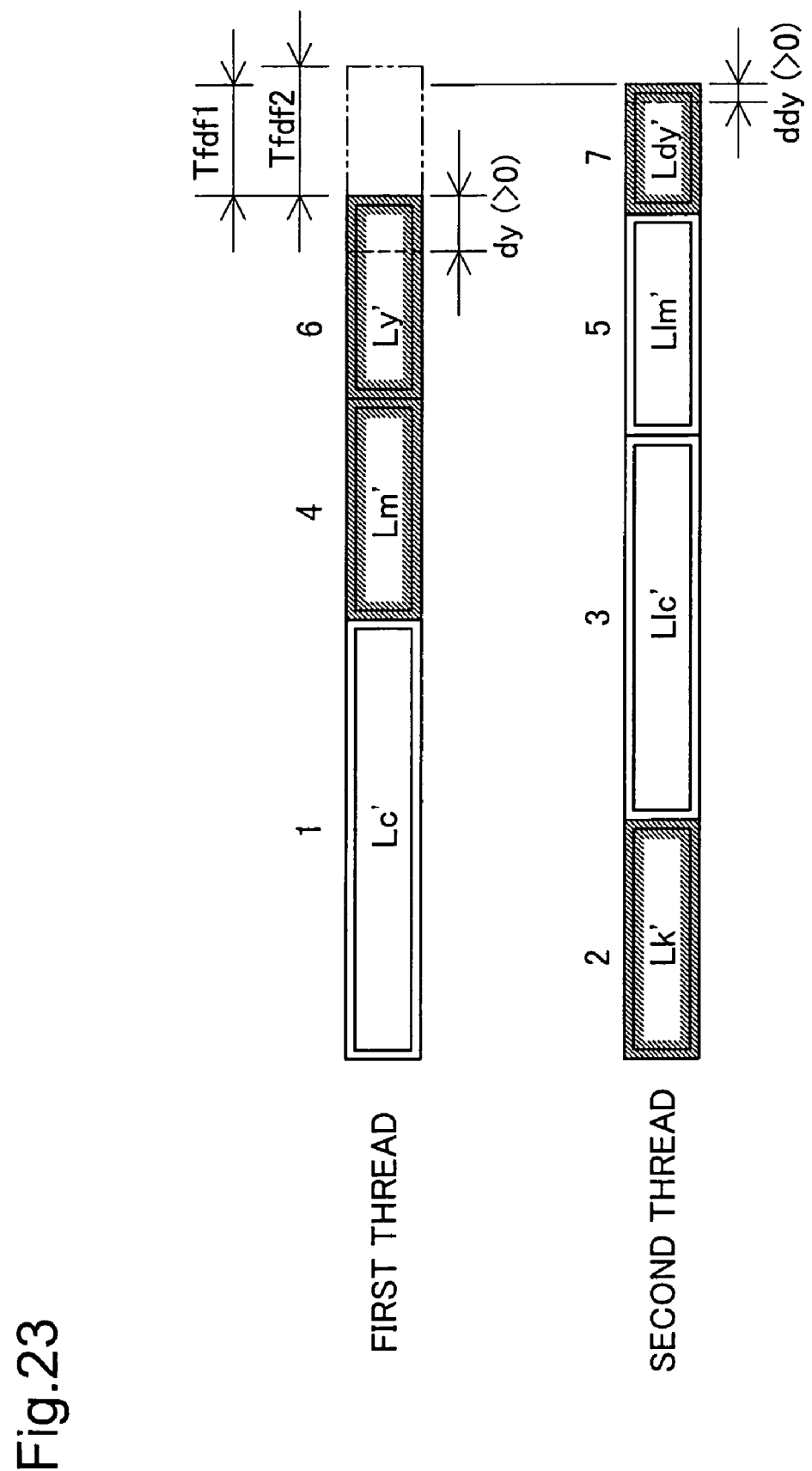
FIG. 23 illustrates a condition in which all unit HT processes have been completed.

FIG. 23 is an illustration showing a condition in which all unit HT processes have been completed. The dark yellow unit HT process requires more time to complete (i.e. by ddy) than the estimated load. As will be apparent from comparison with FIG. 17 of Embodiment 3, with the assignment scheme of Embodiment 3, the dark yellow unit HT process was assigned to the first thread, whereas with Embodiment 4, it is assigned to the second thread. This is due to deviance that has occurred between estimated load of unit HT processes, and actual processing time (load).

In FIG. 23, the dark yellow unit HT process, when the dark yellow unit HT process has been assigned to the first thread, is indicated by a double-dot-and dash line. Here, it is assumed that there is no change in time required for processing, between (1) the case where in the second thread, after the light magenta unit HT process, the dark yellow unit HT process is carried out partially parallel with the yellow unit HT process, and (2) the case where in the first thread, after the yellow unit HT process, the dark yellow unit HT process is carried out with the second thread in the wait state.

In Embodiment 4, Tfdf1 is the differential in completion time by the first thread and the second thread. In contrast, where unit HT processes are executed according to the assignment scheme of Embodiment 3, the differential in completion time is Tfdf2 (>Tfdf1) as shown in FIG. 23. In Embodiment 4, since a unit HT process is newly assigned to the thread that has actually completed processing first, variability in load among threads can be minimized, without any effect on deviance between estimated load and actual processing time.

C. Variations

The invention is not limited to the examples and embodiments set forth hereinabove, but can be reduced to practice in various modes without departing from the spirit thereof, such as the following variations for example.

C1. Variation 1:

Whereas in Embodiment 1, during halftone process assignment, the processing modules (threads) to which unit HT processes are assigned are determined in accordance with the assignment order determined in Step S20 of FIG. 5. However, when assigning unit HT processes in advance, it would be possible for example to assign one of the unit HT processes not yet assigned to a thread, to the thread that, of a plurality of threads, has had the smallest total unit process load assigned to it previously.

Figure 24:
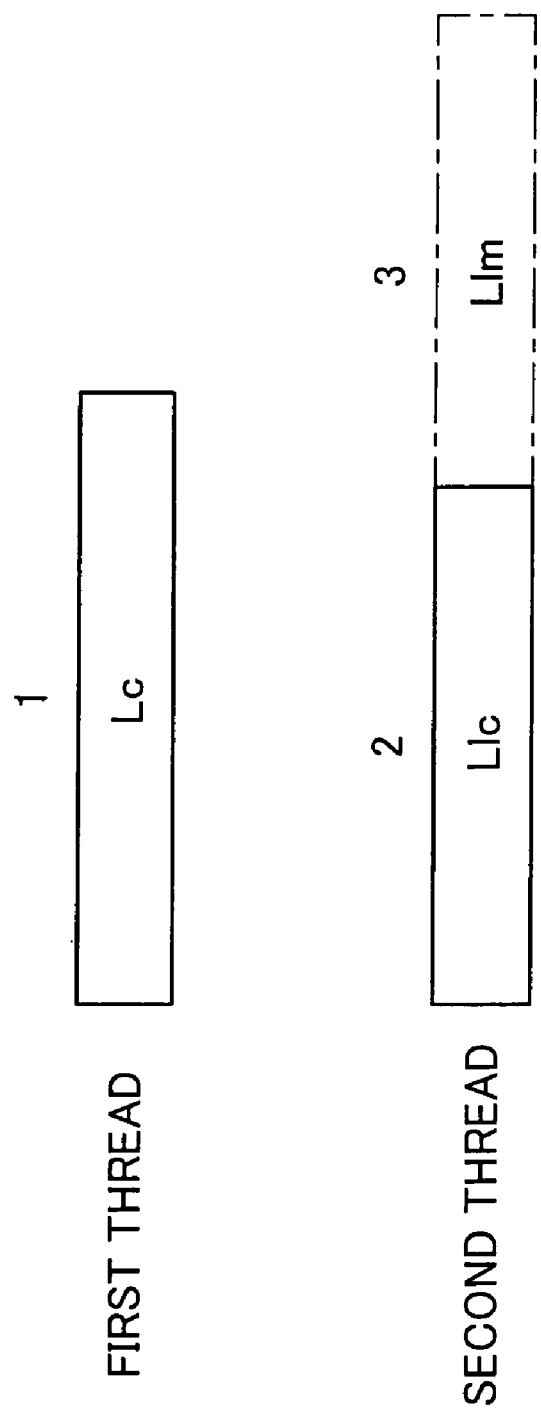
FIG. 24 illustrates a condition in which the light magenta unit HT process has been assigned to the second thread which has had the smallest total unit process load assigned to it previously.

FIG. 24 is an illustration showing a condition in which the light magenta unit HT process has been assigned to the second thread which has had the smallest total unit process load assigned to it previously. The newly assigned light magenta unit HT process is represented by a square drawn with dot-and-dashed lines. In the example of FIG. 24, cyan and light cyan unit HT processes have been initially assigned to the first and second threads, respectively. Next, the light magenta unit HT process, which is third in priority rank, is assigned to the second thread which has had the smallest load assigned to it up to that point. In such an embodiment as well, unit processes can be assigned to processing modules (threads) so as to minimize variability in load among processing modules (threads).

In the embodiments hereinabove, when assigning unit HT processes to processing modules, of those unit processes not yet assigned to processing modules, the unit HT process having the highest priority rank as determined on the basis of estimated load is assigned to a predetermined processing module. However, the unit HT process assigned to a processing module could be selected on some other basis instead. That is, the unit process assigned to a processing module can be a single unit HT process selected on some basis.

In preferred practice, the unit process assigned to a processing module will be the unit process that, of those unit processes not yet assigned to processing modules, has been selected from among unit processes that are other than the unit process having the smallest estimated load. For example, the priority ranks applied to unit processes can be determined in order from largest estimated load. Then, from among all of the unit processes not yet assigned to processing modules, a unit process selected on some basis from among unit processes whose priority ranks in the top half can be designated as the unit process for assignment to the processing module. Alternatively, a unit process selected on some basis from among unit processes whose priority ranks are in the top ⅓ can be designated as the unit process for assignment to the processing module.

C2. Variation 2:

In the embodiments hereinabove, there are two threads. However, the number of threads may be three or more. The embodiments of the invention set forth herein are particularly effective when implemented in cases where the number of threads for executing unit processes is smaller than the number of unit processes. In an embodiment in which there are three or more threads, in preferred practice, when assigning unit HT processes in advance, one of the unit HT processes that has not yet been assigned to a thread will be assigned to the thread which, of the three or more threads, has had the smallest total load of unit processes assigned to it previously. Also, in preferred practice, when assigning unit HT processes while executing halftone processes, unit processes will be assigned to a thread which, of the three or more threads, has been first to complete execution of the unit process assigned to it previously.

In the embodiments hereinabove, one CPU of the computer executes unit HT processes with a plurality of threads, by means of hyper-threading. However, execution of unit HT processes could instead be distributed among several CPUs. In such an embodiment as well, as in the embodiments hereinabove, unit processes can be assigned to CPUs in such a way as to minimize variability in load of assigned unit processes among CPUs.

Also, in the embodiments hereinabove, the number of threads is fixed at 2. However, an embodiment wherein the number of threads created in hyper-threading, or the number of CPUs used in a multi-CPU computer, is variable depending on conditions would also be possible. For example, an embodiment wherein the image processing device which is one possible embodiment of the invention has several operating modes, e.g. an operating mode in which the number of threads is 1, an operating mode in which the number of threads is 2, and an operating mode in which the number of threads is 3, would also be possible. In the event that the threads, CPUs or other processing modules are 2 or more in number, assignment of load and determination of an execution sequence may be performed in by the same procedures as in the embodiments hereinabove. Where there is a single processing module, an embodiment wherein unit processes are executed on processing modules according to a pre-established sequence is possible.

C3. Variation 3:

In the embodiments hereinabove, when estimating loads of unit HT processes, the processing time of unit HT processes for the area LLs (i−1) on which halftone processes have been performed just prior are designated as the loads for the unit HT processes of the corresponding colors. However, unit HT process loads could be estimated on the basis of some other value. For example, the occurrence level or probability of occurrence of dots of each ink color in the area LLs (i−1) on which halftone processes have been performed just prior could be designated as the loads for the unit HT processes for the area LLs (i) on which halftone processes will be performed next.

In such an embodiment, in Step S460 of FIG. 13, the unit HT processes in the second process group are assigned to the threads in order of largest occurrence level or probability of occurrence of dots in the previous area LLs (i−1) (see FIG. 17, FIG. 22, and FIG. 23). Even where in Step S430 of FIG. 13 unit HT processes of the first process group are ranked within their types (see FIG. 14), it is preferable to assign ranks based on occurrence level or probability of occurrence of dots in the previous area LLs (i−1).

For unit HT processes whose halftone process method is the same, load may be decided on a single value. For example, unit HT processes on which halftone process are carried out by the dither method can be assigned a load of 1, while unit HT processes on which halftone process are carried out by the error diffusion method are assigned a load of 3. Alternatively, load may be determined through a combination of halftone process method and processing time, or occurrence level or probability of occurrence, as described above. For example, the load of unit HT processes on which halftone process are carried out by the dither method can be designated as 1דdot probability of occurrence", while the load of unit HT processes on which halftone process are carried out by the error diffusion method can be designated as 3דdot probability of occurrence." That is, load can be arrived at by multiplying dot occurrence level or probability of occurrence by a weighting factor W. Estimation of unit process load can be determined in consideration of execution results of unit process included in the process group executed just prior. That is, it is sufficient that estimation of unit process load be determined taking into consideration the execution results of unit processes included in the process set executed just prior.

C4. Variation 4:

In Embodiment 1, unit HT processes are executed in order of assignment, when assigned to threads. However, scheduling to determine the order of execution of assigned unit HT processes could be carried out separately from assignment of unit HT processes to threads. When determining the order of execution of unit HT processes, an order of execution could be determined such that, for example, unit HT processes by the-dither method and unit HT processes by the error diffusion method are carried out in parallel by different processing modules, to the greatest extent possible.

E5. Variation 5:

In the Embodiments 3 and 4, the second process group assigned to threads after the first process group included two unit HT processes. However, the number of unit HT processes included in the second process group could instead be one, or three or more. That is, the second process group assigned to threads after the first process group can include some unit processes among all the unit processes.

E6. Variation 6:

In Embodiment 3, the unit HT processes were executed in assigned order when assigned to threads. However, scheduling to determine the order of execution of assigned unit HT processes could be carried out separately from assignment of unit HT processes to threads. That is, when assigning unit processes to processing modules, where unit processes of relatively small load are assigned after unit processes of relatively large load have been assigned, and assigning unit processes one at a time to processing modules whose total load assigned up to that point is small, it is possible to carry out assignment with minimal variability in load among processing modules.

E7. Variation 7:

In the embodiments hereinabove, for the first process group, unit HT processes were assigned such that unit HT processes of first type on the error diffusion method and unit HT processes of second type on the dither method are processed in parallel. However, during assignment of the first process group, assignment could be carried out so as to achieve some other object. That is, during assignment of the first process group, assignment may be executed in accordance with any objective. Since assignment of the first process group to processing modules and assignment of the second process group to processing modules are carried out separately, mutually different purposes may be established for these.

E8. Variation 8:

Where the printer 22 which receives the print image data FNL is capable of forming dots of several different sizes (for example, small, medium, and large) for each ink color, the halftone processes may be carried out in units of different types of dots of each ink color. In the embodiments hereinabove, unit HT processes are halftone processes carried out on a per-ink color basis. However, in an embodiment wherein halftone processes are carried out in units of different types of dots of each ink color, the unit HT processes may be halftone processes of units of different types of dots of each ink color.

E9. Variation 9:

In the embodiments hereinabove, seven kinds of ink, namely, cyan (C), magenta (M), yellow (Y), light cyan (LC), light magenta (LM), and dark yellow (DY) are used as chromatic inks. However, it would also be possible to use other chromatic inks (e.g. red (R) or violet (V)), or light and dark chromatic inks of the same color system. It would also be possible to use achromatic colors with different shades, namely, black (K1), light black (K2), and light light black (K3). It is also possible to use clear ink. That is, inks of various colors can be used as the inks, and process groups can include unit HT processes for these various ink colors.

E10. Variation 10:

In the embodiments hereinabove, some of the arrangements realized through hardware could be replaced by software, and conversely some of the arrangements realized through software could be replaced by hardware. For example, some of the functions of the printer driver 96 (see FIG. 1) could be executed by the printer CPU 41.

A computer program for realizing such functions could be provided in a form recorded on a floppy disk, CR-ROM, or other computer-readable recording medium. A host computer may read the computer program from the recording medium and transfer it to an internal storage device or an external storage device. Alternatively, the computer program may be provided to the host computer from a program supplying device, via a communications pathway. When realizing the functions of a computer program, the computer program stored in an internal storage device is executed by the microprocessor of the host computer. Alternatively, the computer program recorded on the recording medium can be executed directly by the host computer.

The Program product may be realized as many aspects. For example:

(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

Herein, "computer" refers to a concept that includes hardware devices and an operating system, and means that the hardware devices operate under the control of the operating system. A computer program realizes the functions of the parts described above, on such a computer. Some of the aforementioned functions can be realized by the operating system, rather than by an application program.

Herein, "computer-readable recording medium" is not limited to flexible disks, CR-ROM, or other portable recording media, but can include computer internal storage devices such various kinds of RAM and ROM, as well as hard disks and other external storage devices fixed to the computer.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A method of executing image processing carried out by means of repeated execution of a process set which includes N unit processes, where N is an integer equal to 3 or greater, comprising:
   assigning the N unit processes of a next process set to be executed to M processing modules prior to execution of the next process set, where M is an integer equal to 2 or greater, but less than N,
   the step of assigning the N unit processes including the steps of:
   (a) estimating loads of respective unit process in the next process set based on execution results of unit processes included in a process set executed immediately prior to execution of the next process set; and
   (b) assigning the N unit processes to the processing modules based on the estimated loads;
   wherein the step (b) includes the step of:
   (b-1) selecting a unit process from unassigned unit processes which are not yet assigned to the processing module and assigning the selected unit process to one of the processing modules.

2. Method according to claim 1 wherein
   the selected unit process is a unit process selected from among the unassigned unit processes, and other than a unit process with the smallest estimated load.

3. Method according to claim 1 wherein
   the selected unit process has the largest estimated load, among the unassigned unit processes.

4. Method according to claim 1 wherein
   each unit process is a halftone process for a predetermined ink color relating to an area of predetermined size in an image,
   the process set is a set of unit processes of mutually different ink colors, targeted to a same area of the image, and
   a plurality of the process sets for adjacent areas in the image are executed in order of arrangement of the adjacent areas in the image.

5. Method according to claim 1 wherein
   the M processing modules have mutually different basic ranks; and
   the step (b) further includes the step of:
   (b2) prior to assigning the selected unit process, selecting one processing module to which the selected unit process is to be assigned, in accordance with an alternate assignment order which includes alternate use of a first order going from a processing module with the highest basic rank to a processing module with the lowest basic rank, and a second order going from the processing module with the lowest basic rank to the processing module with the highest.

6. Method according to claims 1 wherein
   the one processing module to which the selected unit process is assigned is a processing module with the smallest total estimated load of previously assigned unit processes.

7. Method according to claim 1, wherein
   the step (b) further includes the step of:
   (b2) based on the estimated loads, grouping the N unit processes into a first process group and a second process group, wherein the estimated load of each unit process in the second process group is smaller than that of unit processes included in the first process group;
   (b3) assigning unit processes included in the first process group to the processing modules; and
   (b4) after completing assignment of all unit processes included in the first process group to the processing modules, assigning unit processes included in the second process group to the processing modules;
   wherein the step (b4) includes the steps of:
   selecting from processing modules a minimum load processing module which has the smallest total of estimated load of unit processes previously assigned; and
   assigning one unit process included in the second process group that has not yet been assigned to the processing module to the minimum load processing module.

8. Method according to claim 7 wherein
   each unit process is a halftone process for a predetermined ink color relating to an area of predetermined size in an image;
   the process set is a set of unit processes of mutually different ink colors, targeted to a same area of the image, and
   a plurality of the process sets for adjacent areas in the image are executed in order of arrangement of the adjacent areas in the image.

9. Method according to claim 8 wherein the one unit process included in the second process group assigned to the minimum load processing module is an unit process that has the largest estimated load among unit processes included in the second process group unit processes and not yet assigned to the processing modules.

10. Method according to claim 8 wherein
    the unit processes include:
    a first type of unit process wherein the halftone process is performed using a first halftone method; and
    a second type of unit process wherein the halftone process is performed using a second halftone method different from the first halftone method;
    unit processes assigned to the processing modules in the step (b3) are executed in an assigned processing module in order in which the unit processes were assigned in the step (b3); and
    the step (b3) includes the step of assigning the unit processes to the processing modules in such a way that while the first type of unit process is being executed by a processing module, the second type of unit process is executed by another processing module.

11. Method according to claim 10 wherein
    the step (b3) further includes the step of assigning to the minimum load processing module a unit process having the largest estimated load among unit processes that have not yet been assigned to processing units and whose halftone method differs from that of an unit process assigned just prior.

12. Method according to claim 11 wherein
    the first halftone method is an error diffusion method; and
    the second halftone method is a dither method.

13. A method of executing image processing carried out by means of repeated execution of a process set which includes N unit processes, where N is an integer equal to 3 or greater, comprising:

assigning one of the unit processes of a next process set to be executed to one of M processing modules for executing the unit processes while another of the unit processes of the process set is being executed by another of the M processing modules, where M is an integer equal to 2 or greater, but less than N, wherein the step of assigning one of the unit processes including the steps of:

(a) estimating loads of respective unit process in the next process set based on execution results of unit processes included in a process set executed immediately prior to the execution of the next process set;

(b) selecting a unit process which is one of unassigned unit processes, the unassigned unit processes being unit processes which are not assigned to the processing modules; and (c) assigning the selected unit process to a processing module that has completed unit processes previously assigned to.

14. Method according to claim 13 wherein
the selected unit process is a unit process selected from among the unassigned unit processes, and other than a unit process with the smallest estimated load.

15. Method according to claim 13 wherein
the selected unit process has the largest estimated load, among the unassigned unit processes.

16. Method according to claim 13 wherein
each unit process is a halftone process for a predetermined ink color relating to an area of predetermined size in an image, the process set is a set of unit processes of mutually different ink colors, targeted to a same area of the image, and
a plurality of the process sets for adjacent areas in the image are executed in order of arrangement of the adjacent areas in the image.

17. Method according to claim 13, further comprising the step of:

(d) based on the estimated loads, grouping the N unit processes into a first process group and a second process group, wherein the estimated load of each unit process in the second process group is smaller than that of unit processes included in the first process group, wherein the step (c) is one of the steps of:

(c1) assigning as the selected unit process an unit process in the first process group to the processing module that has completed unit processes previously assigned to; and (c2) after completing assignment of all of unit processes in the first process group to the processing modules, assigning as the selected unit process an unit process in the second process group to the processing module that has completed unit processes previously assigned to.

18. Method according to claim 17 wherein
each unit process is a halftone process for a predetermined ink color relating to an area of predetermined size in an image;

the process set is a set of unit processes of mutually different ink colors, targeted to a same area of the image, and
a plurality of the process sets for adjacent areas in the image are executed in order of arrangement of the adjacent areas in the image.

19. Method according to claim 18 wherein
the step (b) includes the step of selecting as the selected unit process an unit process that, of the second process group unit processes not yet assigned to the processing modules, has the largest estimated load.

20. Method according to claim 18 wherein
the unit processes include:
a first type of unit process wherein the halftone process is performed using a first halftone method; and
a second type of unit process wherein the halftone process is performed using a second halftone method different from the first halftone method;
unit processes assigned to the processing modules in the step (c1) are executed in an assigned processing module in order in which the unit processes were assigned in the step (c1); and
the step (c1) includes the step of assigning the selected unit process to the processing module in such a way that while the first type of unit process is being executed by a processing module, the second type of unit process is executed by another processing module.

21. Method according to claim 20 wherein
the step (c1) includes the step of assigning a unit process having the largest estimated load, among unit processes that have not yet been assigned to processing modules and whose halftone method differs from that of an unit process assigned just prior.

22. Method according to claim 21 wherein
the first halftone method is an error diffusion method; and
the second halftone method is a dither method.

23. A computer program product for image processing carried out by means of repeated execution of a process set which includes N unit processes, where N is an integer equal to 3 or greater, wherein the computer program product comprising:

a computer readable medium; and
a computer program stored on the computer readable medium, the computer program comprising:
a portion for assigning the N unit processes of a next process set to be executed to M processing modules prior to execution of the next process set, where M is an integer equal to 2 or greater, but less than N, wherein
the portion for assigning the N unit processes includes:
a first portion for estimating loads of respective unit process in the next process set based on execution results of unit processes included in a process set executed immediately prior to execution of the next process set; and
a second portion for assigning the N unit processes to the processing modules based on the estimated loads,;
wherein the second portion includes:
the third portion for selecting a unit process from unassigned unit processes which are not yet assigned to the processing module and assigning the selected unit process to one of the processing modules.

24. A computer program product for image processing carried out by means of repeated execution of a process set which includes N unit processes, where N is an integer equal to 3 or greater, wherein the computer program product comprising:

a computer readable medium; and
a computer program stored on the computer readable medium, the computer program comprising:
a portion for assigning one of the unit processes of a next process set to be executed to one of M processing modules for executing the unit processes while another of the unit processes of the process set is being executed by another of the M processing modules, where M is an integer equal to 2 or greater, but less than N, wherein
the portion for assigning one of the unit processes includes:

a first portion for estimating loads of respective unit process in the next process set based on execution results of unit processes included in a process set executed immediately prior to the execution of the next process set;

a second portion for selecting a unit process which is one of unassigned unit processes, the unassigned unit processes being unit processes which are not assigned to the processing modules; and a third portion for assigning the selected unit process to a processing module that has completed unit processes previously assigned to.

25. An image processing device for repeatedly executing a process set which includes N unit processes, where N is an integer equal to 3 or greater wherein the device comprises:

an image processing portion having M processing modules for executing the process set to perform image processing, where M is an integer equal to 2 or greater, but less than N; and an assigning portion which is configured to assign the N unit processes of a next process set to be executed to the M processing modules prior to execution of the next process set;

wherein the assigning portion estimates loads of respective unit process in the next process set based on execution results of unit processes included in a process set executed immediately prior to execution of the next process set; and assigns the N unit processes to the processing modules based on the estimated loads, and wherein the assigning portion selects a unit process from unassigned unit processes which are not yet assigned to the processing module, and assigns the selected unit process to one of the processing modules, when assigning the N unit processes to the processing modules.

26. Image processing device according to claim 25 wherein the image processing module is configured to execute the process set by means of hyper-threading, and the processing modules are threads.

27. An image processing device for repeatedly executing a process set which includes N unit processes to perform image processing, where N is an integer equal to 3 or greater wherein the device comprises:

an image processing portion including M processing modules, for executing the process set to perform image processing, where M is an integer equal to 2 or greater, but less than N; and an assigning portion which is configured to assign one of the N unit processes of a next process set to be executed to one of the M processing modules during another of the unit processes of the process set is being executed by another of the M processing modules, wherein the assigning portion estimates loads of respective unit process in the next process set based on execution results of unit processes included in a process set executed immediately prior to the execution of the next process set;

selects a unit process which is one of unassigned unit processes, the unassigned unit processes being unit processes which are not assigned to the processing modules; and assigns the selected unit process to a processing module that has completed unit processes previously assigned to.

28. Image processing device according to claim 27 wherein the image processing module is configured to execute the process set by means of hyper-threading, and the processing modules are threads.

* * * * *